United States Patent
Palin et al.

(10) Patent No.: US 9,635,690 B2
(45) Date of Patent: Apr. 25, 2017

(54) METHOD, APPARATUS, AND COMPUTER PROGRAM PRODUCT FOR IMPROVING SECURITY FOR WIRELESS COMMUNICATION

(71) Applicant: Nokia Corporation, Espoo (FI)

(72) Inventors: Arto Palin, Viiala (FI); Jukka Reunamaki, Tampere (FI); Niko Kiukkonen, Veikkola (FI)

(73) Assignee: Nokia Technologies Oy, Espoo (FI)

( * ) Notice: Subject to any disclaimer, the term of this patent is extended or adjusted under 35 U.S.C. 154(b) by 62 days.

(21) Appl. No.: 14/313,322

(22) Filed: Jun. 24, 2014

(65) Prior Publication Data

US 2015/0373749 A1 Dec. 24, 2015

(51) Int. Cl.
| | |
|---|---|
| *H04B 7/00* | (2006.01) |
| *H04W 76/02* | (2009.01) |
| *H04W 4/00* | (2009.01) |
| *H04W 48/16* | (2009.01) |

(52) U.S. Cl.
CPC .......... *H04W 76/02* (2013.01); *H04W 4/008* (2013.01); *H04W 48/16* (2013.01)

(58) Field of Classification Search
CPC ...... H04W 48/16; H04W 4/008; H04W 76/02
See application file for complete search history.

(56) References Cited

U.S. PATENT DOCUMENTS

| | | |
|---|---|---|
| 5,193,216 A | 3/1993 | Davis |
| 5,471,671 A | 11/1995 | Wang et al. |
| 5,530,702 A | 6/1996 | Palmer et al. |
| 5,732,347 A | 3/1998 | Bartle et al. |
| 6,816,063 B2 | 11/2004 | Kubler et al. |
| 6,892,052 B2 | 5/2005 | Kotola et al. |

(Continued)

FOREIGN PATENT DOCUMENTS

| | | |
|---|---|---|
| EP | 2015274 | 1/2009 |
| EP | 2073514 | 6/2009 |

(Continued)

OTHER PUBLICATIONS

International Search Report for International Application No. PCT/FI2012/050442—Date of Completion of Search: Sep. 18, 2012—4 pages.

(Continued)

*Primary Examiner* — Xin Jia
(74) *Attorney, Agent, or Firm* — Locke Lord LLP

(57) ABSTRACT

In an example embodiment, a method includes receiving, by an apparatus, one or more wireless discovery messages; determining, by the apparatus, whether a wireless device is in close proximity to the apparatus based on information obtained from the one or more received wireless discovery messages; exchanging, by the apparatus, messages with the wireless device in response to having determined that the wireless device is in close proximity to the apparatus; measuring, by the apparatus, signal strength of the exchanged messages while distance changes to the wireless device; and determining, by the apparatus, whether changes in the measured signal strength of the exchanged messages satisfy a predetermined behavior expected for signal strength as distance varies.

20 Claims, 11 Drawing Sheets

(56) References Cited

U.S. PATENT DOCUMENTS

| | | |
|---|---|---|
| 7,075,412 B1 | 7/2006 | Reynolds et al. |
| 7,151,764 B1 | 12/2006 | Heinonen et al. |
| 7,519,682 B2 | 4/2009 | Smith et al. |
| 7,775,432 B2 | 8/2010 | Jalkanen et al. |
| 8,210,433 B2 | 7/2012 | Jalkanen et al. |
| 8,547,867 B2 | 10/2013 | Koo et al. |
| 9,047,054 B1 | 6/2015 | Goldstein et al. |
| 9,158,395 B2 | 10/2015 | Park et al. |
| 2001/0045460 A1 | 11/2001 | Reynolds et al. |
| 2002/0021809 A1 | 2/2002 | Salo et al. |
| 2002/0022961 A1 | 2/2002 | Sepanaho |
| 2002/0023264 A1 | 2/2002 | Aaltonen et al. |
| 2002/0069406 A1 | 6/2002 | Aaltonen et al. |
| 2002/0071436 A1 | 6/2002 | Border et al. |
| 2002/0087997 A1 | 7/2002 | Dahlstrom |
| 2002/0191998 A1 | 12/2002 | Cremon et al. |
| 2003/0043041 A1 | 3/2003 | Zeps et al. |
| 2003/0084177 A1 | 5/2003 | Mulligan |
| 2003/0097304 A1 | 5/2003 | Hunt |
| 2003/0120745 A1 | 6/2003 | Katagishi et al. |
| 2003/0134653 A1 | 7/2003 | Sarkkinen et al. |
| 2003/0220765 A1 | 11/2003 | Ovary et al. |
| 2003/0228846 A1 | 12/2003 | Berliner et al. |
| 2004/0042413 A1 | 3/2004 | Kawamura et al. |
| 2004/0193676 A1 | 9/2004 | Marks |
| 2004/0203413 A1 | 10/2004 | Harumoto |
| 2004/0215816 A1 | 10/2004 | Hayes et al. |
| 2004/0225199 A1 | 11/2004 | Evanyk et al. |
| 2005/0054290 A1 | 3/2005 | Logan et al. |
| 2005/0073522 A1 | 4/2005 | Aholainen et al. |
| 2005/0278646 A1 | 12/2005 | Liscano et al. |
| 2006/0258338 A1 | 11/2006 | Markki et al. |
| 2007/0047505 A1 | 3/2007 | Wassingbo |
| 2007/0141984 A1 | 6/2007 | Kuehnel et al. |
| 2007/0141985 A1 | 6/2007 | Parkkinen et al. |
| 2007/0263551 A1 | 11/2007 | Birchler et al. |
| 2007/0275746 A1 | 11/2007 | Bitran |
| 2007/0291710 A1 | 12/2007 | Fadell |
| 2008/0004021 A1 | 1/2008 | Sanjay |
| 2008/0055632 A1 | 3/2008 | Oshiumi et al. |
| 2008/0090606 A1 | 4/2008 | Hwang et al. |
| 2008/0107054 A1 | 5/2008 | Parts et al. |
| 2008/0146151 A1 | 6/2008 | Lyu et al. |
| 2008/0242220 A1 | 10/2008 | Wilson et al. |
| 2008/0311957 A1 | 12/2008 | Jantunen et al. |
| 2009/0320098 A1 | 12/2009 | Roberts et al. |
| 2010/0035567 A1 | 2/2010 | Vin |
| 2010/0079607 A1 | 4/2010 | Won et al. |
| 2010/0082784 A1 | 4/2010 | Rosenblatt et al. |
| 2010/0093280 A1 | 4/2010 | Ahn et al. |
| 2010/0105328 A1 | 4/2010 | Ahn et al. |
| 2010/0144274 A1 | 6/2010 | McDowall et al. |
| 2010/0211698 A1 | 8/2010 | Krishnaswamy |
| 2010/0241529 A1 | 9/2010 | Kim |
| 2010/0244587 A1 | 9/2010 | Tiovola et al. |
| 2010/0250135 A1 | 9/2010 | Li et al. |
| 2010/0291952 A1 | 11/2010 | Gosset et al. |
| 2010/0317289 A1 | 12/2010 | Desai et al. |
| 2011/0021142 A1 | 1/2011 | Desai et al. |
| 2011/0022661 A1 | 1/2011 | Alsina |
| 2011/0066850 A1 | 3/2011 | Ekberg |
| 2011/0126009 A1 | 5/2011 | Camp, Jr. et al. |
| 2011/0126014 A1 | 5/2011 | Camp, Jr. et al. |
| 2011/0140864 A1 | 6/2011 | Bucci |
| 2011/0140883 A1 | 6/2011 | Yamashita |
| 2011/0191438 A1 | 8/2011 | Huibers et al. |
| 2011/0191823 A1 | 8/2011 | Huibers et al. |
| 2011/0210831 A1 | 9/2011 | Talty et al. |
| 2011/0235624 A1 | 9/2011 | Scott et al. |
| 2011/0263202 A1 | 10/2011 | Lee et al. |
| 2011/0281519 A1 | 11/2011 | Reuss et al. |
| 2011/0317586 A1 | 12/2011 | Palanki et al. |
| 2011/0319020 A1 | 12/2011 | Desai et al. |
| 2011/0319022 A1 | 12/2011 | Arad et al. |
| 2012/0015605 A1 | 1/2012 | Sole |
| 2012/0017257 A1 | 1/2012 | Lee et al. |
| 2012/0068921 A1 | 3/2012 | Jacobsen et al. |
| 2012/0115464 A1 | 5/2012 | Jang |
| 2012/0169473 A1 | 7/2012 | Jalkanen et al. |
| 2012/0289157 A1 | 11/2012 | Palin et al. |
| 2012/0289158 A1 | 11/2012 | Palin et al. |
| 2012/0289159 A1 | 11/2012 | Palin et al. |
| 2012/0289160 A1 | 11/2012 | Palin et al. |
| 2013/0005257 A1 | 1/2013 | Rajaraman et al. |
| 2013/0090061 A1 | 4/2013 | Linde |
| 2013/0109315 A1 | 5/2013 | Polo et al. |
| 2013/0111120 A1 | 5/2013 | Ananthakrishnan et al. |
| 2013/0117693 A1 | 5/2013 | Anderson et al. |
| 2013/0138786 A1 | 5/2013 | Ji et al. |
| 2013/0188538 A1 | 7/2013 | Kainulainen et al. |
| 2013/0229930 A1* | 9/2013 | Akay ............... H04W 52/0245 370/252 |
| 2013/0250931 A1* | 9/2013 | Abraham ............ H04W 8/005 370/338 |
| 2013/0260688 A1 | 10/2013 | Palin et al. |
| 2013/0260690 A1 | 10/2013 | Cha |
| 2014/0018002 A1 | 1/2014 | Jose et al. |
| 2014/0073244 A1 | 3/2014 | Ko et al. |
| 2014/0194062 A1 | 7/2014 | Palin et al. |
| 2014/0302849 A1 | 10/2014 | Palin et al. |
| 2014/0315491 A1 | 10/2014 | Preiszler et al. |
| 2014/0355517 A1 | 12/2014 | Reunamaki et al. |
| 2014/0370811 A1 | 12/2014 | Kang et al. |
| 2014/0380159 A1 | 12/2014 | Reilly et al. |
| 2015/0031288 A1 | 1/2015 | Tubbesing et al. |
| 2015/0126117 A1 | 5/2015 | Wong et al. |
| 2015/0135087 A1 | 5/2015 | Verkasalo |
| 2015/0189426 A1 | 7/2015 | Pang |
| 2015/0193198 A1 | 7/2015 | Hutchings et al. |
| 2015/0195857 A1 | 7/2015 | Pan et al. |
| 2015/0296329 A1 | 10/2015 | Mao et al. |
| 2015/0365999 A1 | 12/2015 | Lee et al. |
| 2015/0373083 A1 | 12/2015 | Geurts et al. |
| 2016/0072855 A1 | 3/2016 | Palin et al. |

FOREIGN PATENT DOCUMENTS

| | | |
|---|---|---|
| EP | 2355563 | 8/2011 |
| EP | 2424281 | 2/2012 |
| WO | WO0051293 | 8/2000 |
| WO | WO0067221 | 11/2000 |
| WO | WO 01/45319 | 6/2001 |
| WO | WO 02/11074 | 2/2002 |
| WO | WO2004038938 | 5/2004 |
| WO | WO2007040398 | 4/2007 |
| WO | WO2008072057 | 6/2008 |
| WO | WO2009013646 | 1/2009 |
| WO | WO2009158663 | 12/2009 |
| WO | WO01/52179 | 7/2011 |
| WO | WO2012127095 | 9/2012 |
| WO | WO2013083868 | 6/2013 |
| WO | WO2013132134 A1 | 9/2013 |

OTHER PUBLICATIONS

European Search Report for EP Application No. 08006467.8-2412/1965555 dated Nov. 2, 2011.
Extended European Search Report for European Patent Application No. 12167079.8-2412—dated Jul. 30, 2012.
Office Action for Korean Application No. 10-2006-7009441 dated Apr. 23, 2007.
Notice of Allowance for Korean Application No. 10-2006-7009441 dated Jan. 7, 2008.
Palin, A., et al., "VoIP call over WLAN with Bluetooth headset—multiradio interoperability solutions", 2005 IEEE Application No. 12167079.8-2412—Date of Completion of Search: Jul. 13, 2012, 12 pages.
"Bluetooth Specification Version 4.0", Jun. 30, 2010, pp. 380-767.
Widmer, P., "Smart Box Software Framework", Vision Document, Apr. 7, 2003, 23 pages.
Opposition Notice and Filing in European Application No. 1 685 689 (No Translation).

(56) References Cited

OTHER PUBLICATIONS

Opposition Response in European Application Patent No. 1 685 689.
International Search Report for International Application No. PCT/FI2013/050085 mailed May 13, 2013.
International Search Report for International Application No. PCT/FI2012/050531—Date of Completion of Search: Sep. 3, 2012—4 pages.
European Search Report for European Patent Application No. 12166717.4-2412—dated Jul. 20, 2012.
Radio Frequency Identification RFID—A basic primer, AIM Inc. White Paper; Aug. 23, 2001; 17 pages; 1.2; The Association of the Automatic Identification and Data Capture Industry (AIM Inc.); WP-98/002R2.

\* cited by examiner

FIG. 6A
MOBILE DEVICE 100

600 →

STEP 602: RECEIVING, BY AN APPARATUS, ONE OR MORE WIRELESS DISCOVERY MESSAGES;

↓

STEP 604: DETERMINING, BY THE APPARATUS, WHETHER A WIRELESS DEVICE IS IN CLOSE PROXIMITY TO THE APPARATUS BASED ON INFORMATION OBTAINED FROM THE ONE OR MORE RECEIVED WIRELESS DISCOVERY MESSAGES;

↓

STEP 606: EXCHANGING, BY THE APPARATUS, MESSAGES WITH THE WIRELESS DEVICE IN RESPONSE TO HAVING DETERMINED THAT THE WIRELESS DEVICE IS IN CLOSE PROXIMITY TO THE APPARATUS;

↓

STEP 608: MEASURING, BY THE APPARATUS, SIGNAL STRENGTH OF THE EXCHANGED MESSAGES WHILE DISTANCE CHANGES TO THE WIRELESS DEVICE; AND

↓

STEP 610 DETERMINING, BY THE APPARATUS, WHETHER CHANGES IN THE MEASURED SIGNAL STRENGTH OF THE EXCHANGED MESSAGES SATISFY A PREDETERMINED BEHAVIOR EXPECTED FOR SIGNAL STRENGTH AS DISTANCE VARIES.

SERVICE DEVICE 102

METHOD, APPARATUS, AND COMPUTER PROGRAM PRODUCT FOR IMPROVING SECURITY FOR WIRELESS COMMUNICATION

FIELD

The technology field relates to wireless communication, more particularly to facilitating secure wireless connection establishment between closely situated apparatuses.

BACKGROUND

Modern society has adopted, and is becoming reliant upon, wireless communication devices for various purposes, such as, connecting users of the wireless communication devices with other users. Wireless communication devices can vary from battery powered handheld devices to stationary household and/or commercial devices utilizing electrical network as a power source. Due to rapid development of the wireless communication devices a number of areas capable of enabling entirely new types of communication applications have emerged.

An example of a wireless short-range communication technology is Bluetooth™ communication protocol, which operates in the 2.4 GHz ISM band. Bluetooth™ is a short-range radio network, originally intended as a cable replacement. Bluetooth™ Technical Specifications are published by the Bluetooth™ SIG, Inc. Bluetooth™ *Specification version 2.0+EDR*, published Oct. 15, 2004 has the original functional characteristics of the first version Bluetooth™ Basic Rate (BR) and adds the Enhanced Data Rate (EDR) feature. Bluetooth™ *Specification version 2.1+EDR*, published Jul. 26, 2007 for Basic Rate/Enhanced Data Rate (BR/EDR), added definitions for new features: Encryption Pause Resume, Erroneous Data reporting, Extended Inquiry Response, Link Supervision Timeout Event, Packet Boundary Flag, Secure Simple Pairing, Sniff Subrating. Bluetooth™ *Specification version 3.0+HS*, published Apr. 21, 2009, updated the standard to integrate the Alternate MAC/PHY and Unicast Connectionless Data features.

The Bluetooth™ *Core Specification, Version 4.0*, Bluetooth™ SIG, Jun. 30, 2010 (incorporated herein by reference), includes the Extended Inquiry Response. An Extended Inquiry Response may be used to provide miscellaneous information during the inquiry response procedure. Data types may be defined for such things as local name and supported services, information that otherwise would have to be obtained by establishing a connection. A device that receives a local name and a list of supported services in an extended inquiry response does not have to connect to do a remote name request and a service discovery protocol (SDP) service search, thereby shortening the time to useful information.

SUMMARY

Method, apparatus, and computer program product example embodiments enhance secure wireless communications.

An example embodiment of the invention includes a method comprising:

receiving, by an apparatus, one or more wireless discovery messages;

determining, by the apparatus, whether a wireless device is in close proximity to the apparatus based on information obtained from the one or more received wireless discovery messages;

exchanging, by the apparatus, messages with the wireless device in response to having determined that the wireless device is in close proximity to the apparatus;

measuring, by the apparatus, signal strength of the exchanged messages while distance changes to the wireless device; and determining, by the apparatus, whether changes in the measured signal strength of the exchanged messages satisfy a predetermined behavior expected for signal strength as distance varies.

An example embodiment of the invention includes a method comprising:

wherein the exchanged messages are wireless discovery messages.

An example embodiment of the invention includes a method comprising:

wherein the one or more wireless discovery messages are at least one of a Bluetooth inquiry response message or a Bluetooth Low Energy advertising message.

An example embodiment of the invention includes a method comprising:

establishing, by the apparatus, a wireless connection with the wireless device in response to determining that the wireless device is in close proximity to the apparatus, wherein the messages are exchanged over the established wireless connection while the apparatus changes its distance from the wireless device and obtains signal information from the wireless connection messages usable for estimating the distance between the apparatus and the wireless device.

An example embodiment of the invention includes a method comprising:

invoking, by the apparatus, a secure application in the apparatus if the changes in the measured signal strength of the exchanged messages satisfy the predetermined behavior expected for signal strength as distance varies.

An example embodiment of the invention includes a method comprising:

wherein the information obtained from one or more wireless discovery messages and the signal information obtained from the exchanged messages, includes at least RSSI information corresponding the distance between the apparatus and the wireless device.

An example embodiment of the invention includes a method comprising:

establishing, by an apparatus, a wireless connection with a wireless device in close proximity to the apparatus, wherein wireless messages are exchanged over the established wireless connection while distance between the apparatus and the wireless device changes;

obtaining, by the apparatus, signal information regarding the wireless messages for estimating the distance between the apparatus and the wireless device;

determining, by the apparatus, whether changes in the obtained signal information satisfy a predetermined behavior expected for signal strength as distance varies;

receiving, by the apparatus, a request from the wireless device for conducting a secure communications session with the wireless device; and invoking, by the apparatus, a secure application in the apparatus if the changes in the obtained signal information satisfy the predetermined behavior expected for signal strength as distance varies.

An example embodiment of the invention includes a method comprising:

increasing, by the apparatus, a quantity of the wireless messages exchanged with the wireless device to enhance the determining whether the predetermined behavior expected for signal strength as distance varies is satisfied, wherein the wireless connection messages are at least one of a Bluetooth basic rate/enhanced data rate data connection packet or a Bluetooth Low Energy data connection packet.

An example embodiment of the invention includes an apparatus comprising:

at least one processor;

at least one memory including computer program code;

the at least one memory and the computer program code configured to, with the at least one processor, cause the apparatus at least to:

receive one or more wireless discovery messages;

determine whether a wireless device is in close proximity to the apparatus based on information obtained from the one or more received wireless discovery messages;

exchange messages with the wireless device in response to having determined that the wireless device is in close proximity to the apparatus;

measure signal strength of the exchanged messages while distance changes to the wireless device; and determine whether changes in the measured signal strength of the exchanged messages satisfy a predetermined behavior expected for signal strength as distance varies.

An example embodiment of the invention includes an apparatus comprising:

wherein the exchanged messages are wireless discovery messages.

An example embodiment of the invention includes an apparatus comprising:

wherein the one or more wireless discovery messages are at least one of a Bluetooth inquiry response message or a Bluetooth Low Energy advertising message.

An example embodiment of the invention includes an apparatus comprising:

the at least one memory and the computer program code configured to, with the at least one processor, cause the apparatus at least to:

establish a wireless connection with the wireless device in response to determining that the wireless device is in close proximity to the apparatus, wherein the messages are exchanged over the established wireless connection while the apparatus changes its distance from the wireless device and obtains signal information from the wireless connection messages usable for estimating the distance between the apparatus and the wireless device.

An example embodiment of the invention includes an apparatus comprising:

the at least one memory and the computer program code configured to, with the at least one processor, cause the apparatus at least to:

invoke a secure application in the apparatus if the changes in the measured signal strength of the exchanged messages satisfy the predetermined behavior expected for signal strength as distance varies.

An example embodiment of the invention includes an apparatus comprising:

wherein the information obtained from one or more wireless discovery messages and the signal information obtained from the exchanged messages, includes at least RSSI information corresponding the distance between the apparatus and the wireless device.

An example embodiment of the invention includes an apparatus comprising:

at least one processor;

at least one memory including computer program code;

the at least one memory and the computer program code configured to, with the at least one processor, cause the apparatus at least to:

establish a wireless connection with a wireless device in close proximity to the apparatus, wherein wireless messages are exchanged over the established wireless connection while distance between the apparatus and the wireless device changes;

obtain signal information regarding the wireless messages for estimating the distance between the apparatus and the wireless device;

determine whether changes in the obtained signal information satisfy a predetermined behavior expected for signal strength as distance varies;

receive a request from the wireless device for conducting a secure communications session with the wireless device; and invoke a secure application in the apparatus if the changes in the obtained signal information satisfy the predetermined behavior expected for signal strength as distance varies.

An example embodiment of the invention includes an apparatus comprising:

the at least one memory and the computer program code configured to, with the at least one processor, cause the apparatus at least to:

increase a quantity of the wireless messages exchanged with the wireless device to enhance the determining whether the predetermined behavior expected for signal strength as distance varies is satisfied, wherein the wireless connection messages are at least one of a Bluetooth basic rate/enhanced data rate data connection packet or a Bluetooth Low Energy data connection packet.

An example embodiment of the invention includes a computer program product comprising computer executable program code recorded on a computer readable, non-transitory storage medium, the computer executable program code comprising:

code for receiving, by an apparatus, one or more wireless discovery messages;

code for determining, by the apparatus, whether a wireless device is in close proximity to the apparatus based on information obtained from the one or more received wireless discovery messages;

code for exchanging, by the apparatus, messages with the wireless device in response to having determined that the wireless device is in close proximity to the apparatus;

code for measuring, by the apparatus, signal strength of the exchanged messages while distance changes to the wireless device; and code for determining, by the apparatus, whether changes in the measured signal strength of the exchanged messages satisfy a predetermined behavior expected for signal strength as distance varies.

An example embodiment of the invention includes a computer program product comprising:

code for invoking, by the apparatus, a secure application in the apparatus if the changes in the measured signal strength of the exchanged messages satisfy the predetermined behavior expected for signal strength as distance varies.

An example embodiment of the invention includes a computer program product comprising computer executable program code recorded on a computer readable, non-transitory storage medium, the computer executable program code comprising:

code for establishing, by an apparatus, a wireless connection with a wireless device in close proximity to the apparatus, wherein wireless messages are exchanged over the established wireless connection while distance between the apparatus and the wireless device changes;

code for obtaining, by the apparatus, signal information regarding the wireless messages for estimating the distance between the apparatus and the wireless device;

code for determining, by the apparatus, whether changes in the obtained signal information satisfy a predetermined behavior expected for signal strength as distance varies;

code for receiving, by the apparatus, a request from the wireless device for conducting a secure communications session with the wireless device; and code for invoking, by the apparatus, a secure application in the apparatus if the changes in the obtained signal information satisfy the predetermined behavior expected for signal strength as distance varies.

An example embodiment of the invention includes a computer program product comprising:

code for increasing, by the apparatus, a quantity of the wireless messages exchanged with the wireless device to enhance the determining whether the predetermined behavior expected for signal strength as distance varies is satisfied, wherein the wireless connection messages are at least one of a Bluetooth basic rate/enhanced data rate data connection packet or a Bluetooth Low Energy data connection packet.

The resulting example embodiments enhance secure wireless communications.

DESCRIPTION OF THE FIGURES

FIG. 6A is an illustration of an example flow diagram of an example process in the mobile wireless device, in accordance with at least one embodiment of the present invention.

Figure 1A:
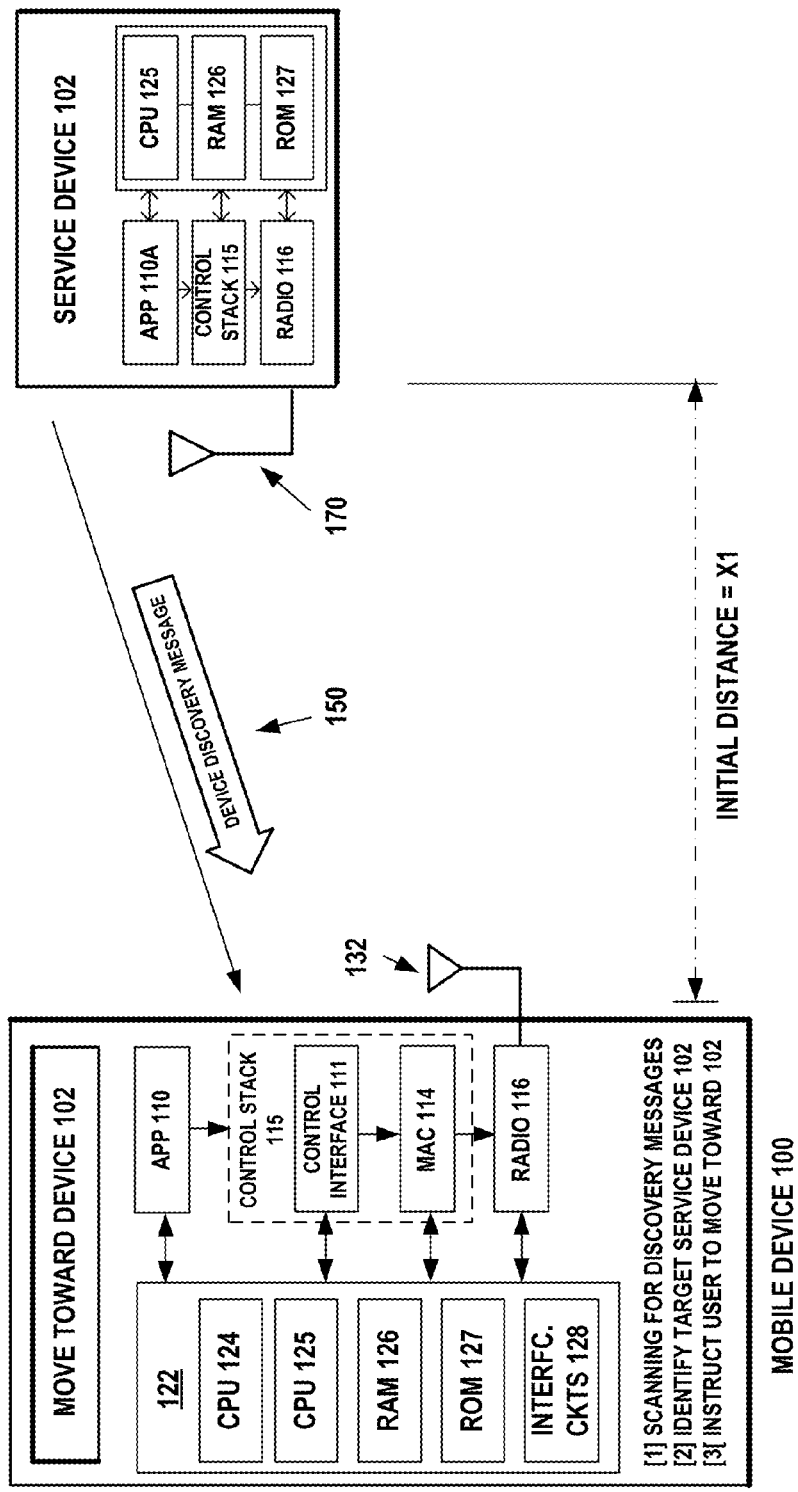
FIG. 1A is an illustration of an example embodiment of a network in a device discovery phase, with a mobile wireless device detecting wireless device discovery messages received from a wireless service device, wherein the mobile wireless device is located at a first distance from the wireless service device, in accordance with at least one embodiment of the present invention.

DISCUSSION OF EXAMPLE EMBODIMENTS
OF THE INVENTION

This section is organized into the following topics:
A. Wireless Short-Range Communication Networks
B. Connection Formation Between Bluetooth™ Devices
C. Touch-to-Select in Bluetooth Technology
D. Bluetooth™ Low Energy (LE) Technology
E. Improving Security Of Proximity Based Pairing A. Wireless Short-Range Communication Networks Short-range communication technologies provide communication solutions appropriate for many data applications, without the cost, traffic and legislative concerns of longer-range communication technologies. Popular short-range communication technologies include Bluetooth basic rate/enhanced data rate (BR/EDR), Bluetooth Low Energy (LE), IEEE 802.11 wireless local area network (WLAN), Wireless Universal Serial Bus (WUSB), ZigBee (IEEE 802.15.4, IEEE 802.15.4a), and near field communication technologies, such as radio frequency identification (RFID) and near field communication (NFC) technology that enable contactless identification and interconnection of wireless devices. Bluetooth Technology provides an example of wireless short-range communication establishment.

B. Connection Formation Between Bluetooth™ Devices

A procedure for forming connections between Bluetooth™ devices is described in the Bluetooth™ *Specification*, Version 4, Jun. 30, 2010. The Bluetooth™ Baseband is the part of the Bluetooth™ system that implements the Media Access Control (MAC) and physical layer procedures to support the connection formation, exchange of data information streams, and ad hoc networking between Bluetooth™ devices. Connection formation may include inquiry, inquiry scanning, inquiry response, in addition to paging, page scanning, and page response procedures.

1. Inquiry

Inquiry is a procedure where a Bluetooth™ device transmits inquiry messages and listens for responses in order to discover the other Bluetooth™ devices that are within the coverage area and set discoverable. Bluetooth™ devices use the inquiry procedure to discover nearby devices, or to be discovered by devices in their locality. A Bluetooth™ device that tries to find other nearby devices is known as an inquiring device and actively sends inquiry requests. Bluetooth™ devices that are available to be found are known as discoverable devices, listen or scan for these inquiry requests, and send responses. The inquiry procedure uses dedicated physical channels for the inquiry requests and responses. The inquiry procedure does not make use of any of the architectural layers above the physical channel, although a transient physical link may be considered to be present during the exchange of inquiry and inquiry response information.

Bluetooth™ devices communicate with one another over 79 physical channels. An inquiring device wanting to discover other devices repetitively probes a first set of 16 frequencies, probing two frequencies every 1250 microseconds. It repeats this at least 256 times. Then, it repetitively probes a second set of 16 frequencies. The inquiring device will repeat entire cycle at least two times. Of the 79 radio carriers, 32 are considered wake-up carriers and the inquiring device broadcasts inquiry packets on these 32 carrier frequencies.

During the inquiry procedure, the inquiring device or master transmits inquiry messages with the general or dedicated inquiry access code. The timing for inquiry is the same as for paging. The identity or ID packet consists of the inquiry access code (IAC). It has a fixed length of 68 bits. The receiver uses a bit correlator to match the received packet to the known bit sequence of the ID packet. In order to discover other devices a device may enter inquiry substate. In this substate, it may repeatedly transmit the inquiry message (ID packet) at different hop frequencies. The inquiry hop sequence is derived from the Lower Address Part (LAP) of the General Inquiry Access Code (GIAC). Thus, even when dedicated inquiry access codes (DIACs) are used, the applied hopping sequence is generated from the GIAC LAP. A device that allows itself to be discovered, may regularly enter the inquiry scan substate to respond to inquiry messages. During the inquiry substate, the discovering device collects the Bluetooth™ device addresses of all devices that respond to the inquiry message. In addition, the discovering device may also collect extended information (e.g. local name and supported services) from devices that respond with an extended inquiry response packet. It may then, if desired, make a connection to any one of the discovered devices by means of the page procedure described below. The inquiry message broadcast by the source does not contain any information about the source. However, it may indicate which class of devices should respond. There is one general inquiry access code (GIAC) to inquire for any device, and 63 values have been reserved as dedicated inquiry access codes (DIAC) that only inquire for a certain type of device. The inquiry access codes are derived from reserved Bluetooth™ device addresses. There is only one DIAC defined in the Bluetooth™ Specification, and it is called the Limited Inquiry Access Code (LIAC). The LIAC is only intended to be used for limited time periods in scenarios where both devices have been explicitly caused to enter this state, usually by user action.

Inquiry scan is a procedure where a Bluetooth™ device listens for inquiry messages received on its inquiry scan physical channel. A device using one of its inquiry scan channels changes the inquiry channel every 1.28 s until it receives an inquiry message on the current channel from another Bluetooth™ device. This is identified by the appropriate inquiry access code. The inquiry scanning device will then follow the inquiry response procedure to return a response to the inquiring device. The inquiry scan substate is very similar to the page scan substate. However, instead of scanning for the device's device access code, the receiver may scan for the inquiry access code long enough to completely scan for 16 inquiry frequencies. The inquiry procedure uses 32 dedicated inquiry hop frequencies according to the inquiry hopping sequence. These frequencies are determined by the general inquiry address. The phase is determined by the native clock of the device carrying out the inquiry scan. Instead of, or in addition to, the general inquiry access code, the device may scan for one or more dedicated inquiry access codes. However, the scanning may follow the inquiry scan hopping sequence determined by the general inquiry address. The inquiry scan interval shall be less than or equal to 2.56 s.

2. Inquiry Response

An inquiry response packet (frequency hop synchronization (FHS)) is transmitted from the inquiry scanning device or slave to the master after the slave has received an inquiry message. This packet contains information necessary for the inquiring master to page the slave and follows 625 microseconds after the receipt of the inquiry message. The inquiry response packet is received by the master at the hop frequency when the inquiry message received by the slave was first in the master-to-slave slot. The slave response substate for inquiries differs completely from the slave response substate applied for pages. When the inquiry message is received in the inquiry scan substate, the recipient may return an inquiry response (FHS) packet containing the recipient's device address (BD_ADDR) and other parameters. If the recipient has non-zero extended inquiry response data to send, it may return an extended inquiry response packet after the FHS packet. On the first inquiry message received in the inquiry scan substate the slave may enter the inquiry response substate. If the slave has non-zero extended inquiry response data to send it may return an FHS packet, with the extended inquiry response bit set to one, to the master 625 microseconds after the inquiry message was received. It may then return an extended inquiry response packet 1250 microseconds after the start of the FHS packet. If the slave's extended inquiry response data is all zeroes the slave may only return an FHS packet with the extended inquiry response bit set to zero.

A contention problem could arise when several devices are in proximity to the inquiring device or master and all respond to an inquiry message at the same time. However, because every device has a free running clock it is highly unlikely that they all use the same phase of the inquiry hopping sequence. In order to avoid repeated collisions between devices that wake up in the same inquiry hop channel simultaneously, a device will back-off for a random period of time. Thus, if the device receives an inquiry message and returns an FHS packet, it will generate a random number, RAND, between 0 and MAX_RAND. For scanning intervals greater than or equal to 1.28 seconds MAX_RAND will be 1023, however, for scanning intervals less than 1.28 s MAX_RAND may be as small as 127. A profile that uses a DIAC may choose to use a smaller MAX_RAND than 1023 even when the scanning interval is greater than or equal to 1.28 s. The slave will return to the CONNECTION or STANDBY state for the duration of at least RAND time slots. Before returning to the CONNECTION and STANDBY state, the device may go through the page scan substate. After at least RAND slots, the device will add an offset of 1 to the phase in the inquiry hop sequence (the phase has a 1.28 second resolution) and return to the inquiry scan substate again. If the slave is triggered again, it will repeat the procedure using a new RAND. The offset to the clock accumulates each time an FHS packet is returned. During a period when the inquiry device is broadcasting inquiry packets, a slave may respond multiple times, but on different frequencies and at different times. Reserved synchronous slots should have priority over response packets; that is, if a response packet overlaps with a reserved synchronous slot, it will not be sent, but the next inquiry message is awaited. If a device has extended inquiry response data to send, but the extended inquiry response packet overlaps with a reserved synchronous slot, the FHS packet may be sent with the EIR bit set to zero.

The messaging during the inquiry routines is summarized as follows:

In step 1, the master transmits an inquiry message using the inquiry access code and its own clock.

In step 2, the slave responds with the FHS packet containing the slave's Bluetooth™ device address, native clock and other slave information. This FHS packet is returned at times that tend to be random. If the slave has non-zero extended inquiry response data to send it will return an FHS packet with the EIR bit set to one to the master 625 us after the inquiry message was received. It then returns an extended inquiry response packet 1250 us after the start of the FHS packet. FHS is always returned 625 us after inquiry message was received. But, consecutive FHS packets are returned according to this random process. The FHS packet is not acknowledged in the inquiry routine, but it is retransmitted at other times and frequencies as long as the master is probing with inquiry messages.

In step 3, if the slave has non-zero extended inquiry response data, it sends an extended inquiry response packet to the master.

The retransmission of the inquiry response can be received by the inquiring devices within roughly 80 or 640 ms depending on inquiry scan interval of the discovered device. The random backoff for devices using scanning interval <1.28 s is from 0 to 79,375 ms and for other devices from 0 to 639,375 ms. The device using the default inquiry interval is using the latter value range.

In order to collect responses from all devices in the range in an error-free environment, the inquiry substate may have to last for 10.24 s unless the inquirer collects enough responses and aborts the inquiry substate earlier. If desired, the inquirer may also prolong the inquiry substate to increase the probability of receiving all responses in an error-prone environment. In consequence of long inquiry state compared to relatively short backoff times, multiple responses may be received from the single device.

3. Extended Inquiry Response

An Extended Inquiry Response may be used to provide miscellaneous information during the inquiry response procedure. Data types are defined for such things as local name and supported services, information that otherwise would have to be obtained by establishing a connection. A device that receives a local name and a list of supported services in an extended inquiry response does not have to connect to do a remote name request and a service discovery protocol (SDP) service search, thereby shortening the time to useful information. If the slave transmits an extended inquiry response packet, it is transmitted 1250 microseconds after the start of the inquiry response packet. The extended inquiry response packet is received by the master at the hop frequency when the inquiry message received by the slave was first in the master-to-slave slot. The extended inquiry response packet is an Asynchronous Connection-oriented Logical transport (ACL) packet with type DM1, DM3, DM5, DH1, DH3 or DH5. To minimize interference it is recommended to use the shortest packet that is capable of containing the data. The packet is sent on the same frequency as the FHS packet, 1250 microseconds after the start of the FHS packet. In the packet header, LT_ADDR may be set to zero. TYPE may be one of DM1, DM3, DM5, DH1, DH3 or DH5. FLOW, ARQN and SEQN may all be set to zero and ignored during receipt. The HEC LFSR may be initialized with the same DCI (default check initialization) as for the FHS packet. In the payload header, LLID may contain the value 10 (start of an L2CAP message or no fragmentation). FLOW may be set to zero and ignored upon receipt. The length of the payload body (LENGTH) may be smaller than or equal to 240 bytes. The CRC LFSR may be initialized with the same DCI as for the FHS packet. The data whitening LFSR may be initialized with the same value as for the FHS packet. The length of the payload body (LENGTH) may be smaller than or equal to 240 bytes. The CRC LFSR may be initialized with the same DCI as for the FHS packet. The data whitening LFSR may be initialized with the same value as for the FHS packet. The payload data has two parts, a significant part followed by a non-significant part. The significant part contains a sequence of data structures. The non-significant part contains all zero octets. The baseband may not change any octets in the significant part. When transmitting data, the non-significant part octets may be omitted from the payload. A device may store a single extended inquiry response packet. This packet may be used with all IACs.

4. Page

Page is the initial phase of the connection procedure where a device transmits a train of page messages until a response is received from the target device, stopped by the host or a timeout occurs. Page scan is a procedure where a device listens for page messages received on its page scan physical channel. In forming a connection, the paging device will become the master and the page scan device will become the slave in a piconet. Initially, after the slave has received an inquiry message, an inquiry response packet is transmitted from the slave to the master. The inquiry response packet sent from the slave contains information necessary for the inquiring master to page the slave, such as Bluetooth™ device address of the slave device. The necessary information may be received by other means, such as Out-Of-Band pairing. Also the page is not always preceded with inquiry, because the address may be known beforehand (for example saved from previous connections). In the paging procedure, one the Bluetooth™ device that will become the master carries out a page procedure by transmitting page messages in connection request packets to the specified Bluetooth™ slave device that carries out a page scanning procedure to listen for connection request packets from the paging device. A connectable Bluetooth™ device listens for a page request on its page scan channel and, once received, enters into a sequence of exchanges with the paging device. In order for a device to connect to another device, it performs frequency hopping all page scan channel frequencies, sending a page request on each frequency and listening for a response. The page scan channel uses an access code derived from the scanning device's Bluetooth™ device address BD_ADDR to identify communications on the channel. The page scan channel uses a slower hopping rate than the hop rate of the paging device, using the estimated Bluetooth™ device clock of the scanning device as an input. A device listening on its page scan channel remains passive until it receives a page request from another Bluetooth™ device, identified by the page scan channel access code. The two devices will then follow the page procedure to form a connection where the paging device is the master and the page scan device is the slave in a piconet. In order for a paging device to connect to another Bluetooth™ device, it uses the page scan channel of the target device in order to send page requests. If the paging device does not know the phase of the target device's page scan channel, it does not know the current hop frequency of the target device. Therefore, the paging device transmits page requests on each of the page scan hop frequencies and listens for a page response. This is done at a faster hop rate, allowing the paging device to cover all page scan frequencies in a short period of time. The paging device may have some knowledge of the target device's Bluetooth™ clock, such as indicated during a previous inquiry transaction between the two devices, and may be able to predict the phase of the target device's page scan channel. It may use this information to optimize the synchronization of the paging and page scanning process and speed up the formation of the connection.

5. Bluetooth™ RSSI

The received signal strength indicator (RSSI) is a measurement of the power present in a received radio signal. Bluetooth receiver circuits may include an RSSI detector circuit to measure the strength of an incoming signal and generate an output representing the signal strength. For example, the received RF signal may be amplified and downconverted to an intermediate frequency (IF); then channel selection is performed on the IF signal, and the power of the IF signal in the selected channel is measured as the receiver signal strength indicator (RSSI) value. If the Bluetooth receiver circuit supports RSSI, the accuracy may be +/−6 dBm or better.

RSSI Monitoring of Inquiry Response and Extended Inquiry Response Packets

During Bluetooth discovery, before a connection is created, the RSSI is measured from Inquiry Response (FHS) packets when it is received by an inquiring device if enabled by the host.

When the controller receives an Inquiry Response (FHS) without following an Extended Inquiry Response, an HCI Inquiry Result with RSSI event is sent by the controller to the host application, which indicates that a remote Bluetooth device has responded during the current Inquiry process. This event will be sent from the Controller to the Host typically as soon as an Inquiry Response from a remote device is received. The RSSI parameter is measured during the FHS packet returned by each responding slave.

When the controller receives an Inquiry Response (FHS) following with an Extended Inquiry Response, an HCI Extended Inquiry Result event is sent by the controller to the host application, which indicates that a remote Bluetooth device has responded during the current inquiry process with extended inquiry response data. This event will be sent from the Controller to the Host upon reception of an Extended Inquiry Response from a remote device. One single Extended Inquiry Response is returned per event. This event contains RSSI and inquiry response data for the remote device that responded to the latest inquiry. The RSSI parameter is measured during the FHS packet returned by each responding slave.

RSSI Monitoring of Data Packets Received Over a Connection

After the discovery phase is completed, once a Bluetooth device is connected to another Bluetooth device, the received signal strength indication (RSSI) may be used by a receiving device to monitor the received power level of the data communication packets received over the connection. The RSSI value is calculated from received packet in the Bluetooth physical layer, and may be read by the host application for example through the host controller interface (HCI) Read RSSI command, for example once per second.

The Read RSSI Command will read the value of the received signal strength indication (RSSI) for data communication packets received over the connection to another Bluetooth controller. The RSSI value is referenced with respect to a Connection_Handle that identifies the connection and is assigned when the connection is created. The Connection_Handle is used by the Bluetooth controller to determine which set of buffers to use and the logical link over which the data is to be sent.

Measuring Pathloss with the RSSI and the TX Power Level

The TX Power Level data field in the Extended Inquiry Response packet indicates the transmitted power level of the FHS and EIR packets at the transmitter of the sending device. The TX Power Level data field may be used to calculate path loss of a received packet when the receiving device measures the RSSI of the received FHS packet, using the following equation:

$$\text{pathloss} = Tx\text{Power Level} - \text{RSSI of the inquiry response packet}$$

For example, if Tx Power Level=+4 (dBm) and the RSSI on the inquiry response packet is −60 (dBm) then the total pathloss is +4−(−60)=+64 dB. If a second inquiry response packet were received at −40 dBm with a Tx Power Level data=+15 dBm the resulting pathloss would be +55 dB. An application may use these pathloss values to choose which device it thinks might be closer (the one with the lower pathloss value).

Unfortunately, due to fading and varying antenna, circuit, and chip characteristics, these resulting pathloss values may have some uncertainty. Some of the uncertainty (for example, due to fading) may be able to be alleviated if multiple inquiry response packets are received from the same device.

6. Bluetooth™ Host Controller Interface

The Bluetooth™ radio in a device may include the host controller interface that provides a command interface between the host application in the device and the link layer of the Bluetooth™ radio, also referred to as the controller, to enable access to hardware status and control registers of the Bluetooth™ radio.

The host controller interface (HCI) is described in the Bluetooth™ Core Specification. The Host will receive asynchronous notifications of HCI events from Host Controller Transport Layer. HCI events are used for notifying the Host when something occurs. When the Host discovers that an event has occurred, it will then parse the received event packet to determine which event occurred. The commands and events are sent between the Host and the Controller. These are grouped into logical groups by function.

The HCI provides a command interface between the host application in a device and the Bluetooth™ link layer, provides access to hardware status and control registers of the Bluetooth™ radio, and provides a uniform method of accessing the Bluetooth™ baseband capabilities.

Discovery Phase HCI Commands and Events

The device discovery group of commands and events allow a device to discover other devices in the surrounding area. The host controller interface includes the standard HCI Inquiry Result Event logic and HCI Extended Inquiry Result Event logic that recognizes the receipt of the FHS packet and the following EIR packet, respectively. Some of the HCI commands and events for device discovery are described as follows:

Inquiry Command

The HCI Inquiry command will cause the Bluetooth Controller to enter Inquiry Mode to transmit inquiry packets used to discover other nearby Bluetooth devices.

Inquiry Result Event

HCI Inquiry Result Event:

The inquiry result event indicates that a remote device has responded with an inquiry response (IR), i.e. with an FHS packet, during the current inquiry process. This event will be sent from the Bluetooth™ Controller to the Host as soon as an Inquiry Response from a remote device is received. The event parameters in the HCI inquiry result event include BD_ADDR and Class_of_Device of the remote responding device and Clock_Offset OFFSET(A,B) between the responding device and the inquiring device.

Inquiry Result with RSSI Event

The Inquiry Result with RSSI event indicates that a remote Bluetooth device has responded with an inquiry response (FHS) packet during the current Inquiry process. The event reported to the host includes the BD_ADDR address for the device that responded, the Class of Device for the device, the clock offset between the responding device and the receiving device, and the measured RSSI of the received inquiry response packet in units of dBm. This is similar to the inquiry result event, but it includes the RSSI value calculated by the controller.

Extended Inquiry Result Event

HCI Extended Inquiry Result Event:

The extended inquiry result event indicates that another Bluetooth™ device has responded during the current inquiry process with extended inquiry response data. Data received in this event will be sent from the device's Controller to the Host upon reception of an EIR from a remote device. One single extended inquiry response is returned per event. The event reported to the host includes the received signal strength indication (RSSI) measurement and inquiry response data for the device that responded to the latest inquiry. The RSSI parameter is measured during the FHS packet returned by each responding device. If an extended inquiry response packet from the same remote device is correctly received in a later response, another event is generated. The Extended_Inquiry_Response data fields are not interpreted by the controller. The standard HCI Extended Inquiry Result Event logic performs the HCI extended inquiry result event procedure to extract the data from the received extended inquiry response packet and to send this data to the host application. The received EIR data extracted from the packet may be passed unaltered to the host application.

Read Inquiry Response Transmit Power Level Command

This command will read the inquiry response Transmit Power level data, expressed in a field of the EIR packet, indicating the power that was used to transmit the FHS and EIR data packets during the discovery phase.

HCI Write Extended Inquiry Response Command

The Write Extended Inquiry Response command writes the extended inquiry response to be sent to an inquiring device during the extended inquiry response procedure. The write extended inquiry response command will write the data that the device's host wishes to send in the extended inquiry response packet during inquiry response. The FEC_Required command parameter states if forward error correction (FEC) encoding is required. The initial value of the inquiry response data is all zero octets. The controller does not interpret the extended inquiry response data, but passes it on to the baseband medium access control and physical radio for transmission in an EIR packet.

Write Inquiry Transmit Power Level Command

The Write Inquiry Transmit Power Level command is used by the transmitting device to write the transmit power level used to transmit the inquiry data packets.

Connection Phase HCI Commands and Events

Read RSSI Command

After the discovery phase is completed, once a Bluetooth device is connected to another Bluetooth device, the received signal strength indication (RSSI) may be used by a receiving device to monitor the received power level of the data communication packets received over the connection. The RSSI value is calculated by the Bluetooth physical layer, and may be read by the host application through the host controller interface (HCI) Read RSSI command.

The Read RSSI command will read the value of the received signal strength indication (RSSI) for data communication packets received over the connection to another Bluetooth controller. The RSSI value is referenced with respect to a Connection_Handle that identifies the connection and is assigned when the connection is created. The Connection_Handle is used by the Bluetooth controller to determine which set of buffers to use and the logical link over which the data is to be sent.

The RSSI parameter in the Read RSSI command is a signed 8-bit value, and is interpreted as an indication of arriving signal strength at the antenna measured in dBm. This command reads the Received Signal Strength Indication (RSSI) value from the Controller. For a Basic Rate/Enhanced Data Rate (BR/EDR) Controller, a Connection_Handle is used as the Handle command parameter and return parameter. The RSSI parameter returns the difference between the measured Received Signal Strength Indication (RSSI) and the limits of the Golden Receive Power Range for a Connection Handle to another BR/EDR Controller. The Connection_Handle must be a Connection_Handle for an ACL connection. Any positive RSSI value returned by the Controller indicates how many dB the RSSI is above the upper limit, any negative value indicates how many dB the RSSI is below the lower limit. The value zero indicates that the RSSI is inside the 20 dB-wide Golden Receive Power Range. The accuracy of the dB values will depend on the Bluetooth hardware. The only requirements for the hardware are that the BR/EDR Controller is able to tell whether the RSSI is inside, above or below the Golden Device Power Range. The RSSI measurement compares the received signal power with two threshold levels, which define the Golden Receive Power Range. The lower threshold level corresponds to a received power between −56 dBm and 6 dB above the actual sensitivity of the receiver. The upper threshold level is 20 dB above the lower threshold level to an accuracy of +/−6 dB.

Read Transmit Power Level Command

The Read Transmit Power Level command will read the values for the Transmit Power Level parameter for the specified Connection_Handle for data communication packets during the connection phase, in a range of −30 to +20 dBm.

C. Touch-to-Select in Bluetooth Technology

The Bluetooth Touch-to-select feature employs Received Signal Strength Indication (RSSI) information calculated from the FHS packet, which is used in determining that an inquiry scanning device is within "touch range", i.e. proximate or in close proximity of the inquiring device, and when a threshold for that close proximity is met. This may provide an "intent to share" or "touch to connect" feature.

The inquiring device may measure the signal strength (e.g., RSSI) of each response message from an inquiry scanning device, which may be used in ordering the responding devices. In this manner, the inquiry scanning device with the highest measured signal strength is listed first (e.g., wherein the measured signal strength may correlate to the distance between the inquiring device and the responding inquiry scanning device).

An inquiry scanning device receiving inquiry packets from an inquiring device may respond by transmitting an inquiry response FHS packet or an FHS packet followed by an EIR packet. The host in the inquiring device may recognize events triggered by the responses. The reported events may include RSSI measurement values made by the inquiring device on the received FHS packets. From the RSSI values, the host in the inquiring device may detect when an inquiry scanning device is most likely within "touching range", that is within a distance from the inquiring device that indicates touching-related operations may be executed.

It may also be possible to determine when an inquiry scanning device is moving closer to an inquiring device. The Bluetooth controller in the inquiring device may report the receipt of FHS and/or EIR inquiry responses to its host software stack as an HCI Inquiry Event that may contain the measurement of the RSSI performed on the received response. In instances where EIR responses are received, the Bluetooth controller in the inquiring device may report each received EIR as an HCI Extended Inquiry Result Event. When an inquiry scanning device moves closer to an inquiring device, the Bluetooth controller in the inquiring device may report an RSSI for each inquiry response, thereby enabling the inquiring device to track the changing RSSI levels of the scanning device and thus its relative movement. When the measured RSSI satisfies predetermined response criteria (e.g., including the RSSI being measured to be at or above a predetermined level), the corresponding scanning device may be selected for touch-related operations (e.g., expedited connection establishment).

The Bluetooth controller in an inquiring device reports the receipt of inquiry responses to its host, which also has Touch selection software running Typical response criteria may include RSSI values measured on the responses, being sensed above certain fixed threshold value, such as −30 dBm. Sensing a response packet having an RSSI of −30 dBm will then cause the Touch selection software in the inquiring device to trigger device selection, while an RSSI of −31 dBm will not. It may also be possible that responding inquiry scanning devices may send Tx power information in EIR packet, since this is an existing feature in the Bluetooth specification v4.0. In instances where Tx power information about the inquiry scanning device is available in the EIR packet, the predetermined response criteria may include an adjustable RSSI threshold value that accounts for variations in the Tx power. For example, the threshold value may be set at 30 dBm below the EIR Tx power, so that if the Tx power level in an FHS packet is +20 dBm then the threshold value that will trigger selection may be the FHS packet being measured at −10 dBm, or 30 dBm below of Tx power level. Secondly, to ensure that devices are maintained in close proximity, the predetermined response criteria may require that more than one EIR must have a sensed RSSI at or above a threshold value. In addition different thresholds may be used for different phases, for example, first the threshold value may be set above −45 dBm to select one or more candidate devices and then a second, more decisive threshold value may be set above −30 dBm.

The detected RSSI may also be a function of: [1] antenna location of the inquiry scanning device sending the signal and [2] antenna location of the inquiring device sensing the signal. The results may be improved if the antennas were brought into close proximity, which may require moving away from obstructions and changing the orientation of one or both devices.

D. Bluetooth™ Low Energy (LE) Technology

The Bluetooth™ Core Specification, Version 4.0 includes the Bluetooth LE protocol for products that require lower power consumption, lower complexity, and lower cost than would be possible using the BR/EDR protocol. Bluetooth LE is designed for applications requiring lower data rates and shorter duty cycles, with a very-low power idle mode, a simple device discovery, and short data packets. Bluetooth LE devices may employ a star topology, where one device serves as a master for a plurality of slave devices, the master dictating connection timing by establishing the start time of the first connection event and the slave devices transmitting packets only to the master upon receiving a packet from the master. According to Bluetooth LE communication protocol all connections are point-to-point connections between two devices (the master and the slave).

The Bluetooth LE protocol allows a star network topology in connections, where one device serves as a master for a plurality of slave devices. The master device dictates the connection timing and communication operations of the one or more slave devices. Bluetooth LE communicates over a total of 40 RF channels, each having a bandwidth of 2 MHz. Data communication between Bluetooth LE devices occurs in 37 pre-specified data channels, of the 40 RF channels. All data connection transmissions occur in connection events wherein a point-to-point connection is established between the master device and a slave device. In the Bluetooth LE protocol, a slave device provides data through Bluetooth LE communication to the master device to which it is connected. The remaining 3 channels, of the 40 RF channels, are advertising channels used by devices to advertise their existence and capabilities. The Bluetooth LE protocol defines a unidirectional connectionless broadcast mode on the advertising channels.

The Link Layer provides a state machine with the following five states: Standby State, Advertising State, Scanning State, Initiating State, and Connection State. The Link Layer state machine allows only one state to be active at a time. The Link Layer in the Standby State does not transmit or receive any packets and can be entered from any other state. The Link Layer in the Advertising State will be transmitting advertising channel packets and possibly listening to and responding to responses triggered by these advertising channel packets. A device in the Advertising State is known as an advertiser. The Advertising State can be entered from the Standby State. The Link Layer in the Scanning State will be listening for advertising channel packets from devices that are advertising. A device in the Scanning State is known as a scanner. The Scanning State can be entered from the Standby State. The Link Layer in the Initiating State will be listening for advertising channel packets from a specific device and responding to these packets to initiate a connection with that specific device. A device in the Initiating State is known as an initiator. The Initiating State can be entered from the Standby State. The Connection State of the Link Layer may be entered either from the Initiating State or the Advertising State. A device in the Connection State is known as being in a connection over a data channel. Within the Connection State, two roles are defined: the Master Role and the Slave Role. When a device in the Initiating State, enters the Connection State, it is in the Master Role, it exchanges data packets with a slave device in a data channel, and it defines the timings of transmissions. When a device in the Advertising State, enters the Connection State, it is in the Slave Role and exchanges data packets with a master device in a data channel, wherein the master device defines the timings of transmissions.

The Bluetooth LE radio operates in the unlicensed 2.4 GHz ISM band, in the same manner as does the Basic Rate/Enhanced Data Rate (BR/EDR) radio. Bluetooth LE supports very short data packets, from 10 octets to a maximum of 47 octets, giving it a low duty cycle. Bluetooth LE employs a frequency hopping transceiver with many frequency hopping spread spectrum (FHSS) carriers, with a bit rate of 1 Megabit per second (Mb/s).

Bluetooth LE employs two multiple access schemes: Frequency division multiple access (FDMA) and time division multiple access (TDMA). Forty (40) physical channels, separated by 2 MHz, are used in the FDMA scheme. Three (3) are used as advertising channels and 37 are used as data channels. A TDMA based polling scheme is used in which one device transmits a packet at a predetermined time and a corresponding device responds with a packet after a predetermined interval.

The physical channel is sub-divided into time units known as events. Data is transmitted between Bluetooth LE devices in packets that are positioned in these events. There are two types of events: Advertising and Connection events.

Devices that transmit advertising packets on the advertising Physical Layer (PHY) channels are referred to as advertisers. Devices that receive advertising on the advertising channels without the intention to connect to the advertising device are referred to as scanners. Devices that form a connection to another device by listening for connectable advertising packets, are referred to as initiators. Transmissions on the advertising PHY channels occur in advertising events.

In the Bluetooth™ Core Specification, Version 4.0, there are four advertising event types: connectable undirected advertising (ADV_IND), connectable directed advertising (ADV_DIRECT_IND), scannable undirected advertising (ADV_SCAN_IND), and non-connectable undirected advertising (ADV_NONCONN_IND). At the start of each advertising event, the advertiser sends an advertising packet corresponding to the advertising event type. The header of the advertising channel packet identifies the packet type in a four-bit PDU Type field encoding. There are seven values currently assigned to the four-bit PDU Type field, ranging from 0000 to 0110, with the values 0111 to 1111 being reserved for future use.

The initiator device that receives the advertising packet, may make a connect request (CONNECT_REQ) to the advertiser device on the same advertising PHY channel. The CONNECT_REQ request includes fields for access address AA, CRC, WinSize, WinOffset, Interval, Latency, Timeout, ChannelMap, Hop count, and sleep clock accuracy SCA. The four-bit PDU Type field in the header of the CONNECT_REQ advertising channel packet, is 0101. When the advertiser device accepts the CONNECT_REQ request, a point-to-point connection results between the initiator device that becomes the master device, and the advertiser device that becomes the slave device in a piconet. The master and the slave devices know at what time and in which frequency the connection is in operation. The data channel changes between every connection event and the start of connection events are spaced regularly with the connection interval that is provided in the CONNECT_REQ packet.

In the connectable undirected advertising (ADV_IND) channel packet, the ADV_IND PDU has a payload field containing AdvA and AdvData fields. The AdvA field contains the advertiser's public or random device address and the AdvData field may contain Advertising data from the advertiser's host. The PDU may be used in connectable undirected advertising events. The four-bit PDU Type field in the header of the ADV_IND advertising channel packet, is 0000.

In the connectable directed advertising (ADV_DIRECT_IND) channel packet, the ADV_DIRECT_IND PDU has the payload field containing AdvA and InitA fields. The AdvA field contains the advertiser's public or random device address. The InitA field is the address of the device to which this PDU is addressed. The InitA field may contain the initiator's public or random device address. The PDU may be used in connectable directed advertising events. This packet may not contain any host data. The four-bit PDU Type field in the header of the ADV_DIRECT_IND advertising channel packet, is 0001.

In a non-connectable undirected event type advertising channel packet, ADV_NONCONN_IND, a scanner device is allowed to receive information in the advertising channel packet, but scanner/initiator devices are not allowed to transmit anything in the advertising channels upon receiving the ADV_NONCONN_IND advertising channel packets. When the non-connectable undirected event type is used, non-connectable advertising indications ADV_NONCONN_IND packets are sent by the Link Layer. The non-connectable undirected event type allows a scanner to receive information contained in the ADV_NONCONN_IND from the advertiser. The advertiser may either move to the next used advertising channel index or close the advertising event after each ADV_NONCONN_IND that is sent. The four-bit PDU Type field in the header of the ADV_NONCONN_IND advertising channel packet, is 0010.

In the scannable undirected advertising (ADV_SCAN_IND) channel packet, the ADV_SCAN_IND PDU has the payload field containing AdvA and AdvData fields. The AdvA field contains the advertiser's public or random device address. The PDU may be used in scannable undirected advertising events. The AdvData field may contain Advertising Data from the advertiser's host. The four-bit PDU Type field in the header of the ADV_SCAN_IND advertising channel packet, is 0110.

In the Bluetooth™ Core Specification, Version 4.0, if the advertiser is using a connectable advertising event, an initiator may make a connection request using the same advertising PHY channel on which it received the connectable advertising packet. The advertising event is ended and connection events begin if the advertiser receives and accepts the request for a connection to be initiated. Once a connection is established, the initiator becomes the master device in a piconet and the advertising device becomes the slave device. Within a connection event, the master and slave alternate sending data packets using the same data PHY channel.

According to the Bluetooth Specification V4.0, Bluetooth LE device discovery involves different operational processes for devices with different roles. In particular:

Slave Device, being an advertiser, performs an advertising process during which the device repeatedly enters Advertising Events. The interval of each start of Advertising Event, Ta, composes of a fixed-length "advInterval" and a random-length "advDelay". In Advertising Event, the device sends advertising Packet Data Units (PDUs) in broadcasting channel 37, 38 and 39, respectively.

Master Device, being an initiator/scanner, performs the initiating/scanning process. An initiating/scanning process consists of repeated "scanInterval", each of which contains a "scanWindow". In a different "scanWindow", the device changes the RF module to receive the state and listens to advertising PDUs on different broadcasting channels; while out of the "scanWindow", it does routine scheduling, or turns off the RF module.

If any advertising PDU is received by an initiator/scanner, it means the initiator/scanner successfully discovers the advertising device. For the initiator, it can directly send back a "CONN_REQ" to establish a connection with that advertiser. For a scanner, it can send out a "SCAN_REQ" to ask for more information from that advertiser.

Example non-limited use cases for Bluetooth LE technology include sports and fitness, security and proximity and smart energy. Bluetooth LE technology is designed for devices to have a battery life of up to one year such as those powered by coin-cell batteries. These types of devices include watches that will utilize Bluetooth LE technology to display Caller ID information and sports sensors that will be utilized to monitor the wearer's heart rate during exercise. The Medical Devices Working Group of the Bluetooth SIG is also creating a medical devices profile and associated protocols to enable Bluetooth applications for Bluetooth LE devices.

A Bluetooth LE advertising channel may be shared by any number of Bluetooth LE devices. Any number of Bluetooth LE devices may transmit advertising packets while sharing the same three advertising PHY channels. In high-density environments, however, since there are a large number of nodes to be discovered, the probability of broadcasting conflict will inevitably increase, causing network access time to increase, and also lowering the energy efficiency of the whole network.

1. Bluetooth™ RSSI

The received signal strength indicator (RSSI) is a measurement of the power present in a received radio signal. Bluetooth receiver circuits may include an RSSI detector circuit to measure the strength of an incoming signal and generate an output representing the signal strength. For example, the received RF signal may be amplified and downconverted to an intermediate frequency (IF); then channel selection is performed on the IF signal, and the power of the IF signal in the selected channel is measured as the receiver signal strength indicator (RSSI) value. If the Bluetooth receiver circuit supports RSSI, the accuracy may be +/−6 dBm or better.

RSSI Monitoring of Bluetooth LE Packets

During Bluetooth discovery in Bluetooth LE, before a connection is created, the RSSI may be measured from advertising packets received in broadcasting channel 37, 38, or 39, when they are received by a scanning device, if enabled by the host.

When the controller receives an advertising packet, an HCI LE Advertising Report event is sent by the controller to the host application. The HCI LE Advertising Report event indicates that a Bluetooth device or multiple Bluetooth devices have been detected during an active scan or during a passive scan. The HCI LE Advertising Report event includes a parameter N that indicates the RSSI of the received packet, with N being one octet representing the magnitude of the RSSI, with a range in units of dBm of $-127 \leq N \leq +20$. This event will be sent from the Controller to the Host as soon as an advertising packet from a remote device is received. The RSSI parameter is measured during the receipt of the advertising packet. This event contains RSSI and advertising packet data for the remote device, among other information.

RSSI Monitoring of Data Packets Received Over a Connection

After the discovery phase is completed, once a Bluetooth LE device is connected to another Bluetooth device, the received signal strength indication (RSSI) may be used by a receiving device to monitor the received power level of the data communication packets received over the connection. The RSSI value is calculated from received packet in the Bluetooth physical layer, and may be read by the host application for example through the host controller interface (HCI) Read RSSI command, for example once per second.

The Read RSSI Command will read the value of the received signal strength indication (RSSI) for data communication packets received over the connection to another Bluetooth LE controller. The RSSI value is referenced with respect to a Connection_Handle that identifies the connection and is assigned when the connection is created. The Connection_Handle is used by the Bluetooth controller to determine which set of buffers to use and the logical link over which the data is to be sent.

In Bluetooth LE, the meaning of the RSSI metric is an absolute receiver signal strength value in dBm to ±6 dBm accuracy. If the RSSI cannot be read, the RSSI metric is set to 127.

Measuring Pathloss with the RSSI and the TX Power Level

The TX Power Level data field in the Bluetooth LE advertising packet indicates the transmitted power level of the advertising packets at the transmitter of the sending device. The TX Power Level is reported to the host in response to the HCI LE Read Advertising Channel Tx Power Command. The TX Power Level data field may be used to calculate path loss of a received packet when the receiving device measures the RSSI of the received advertising packet, using the following equation:

$$pathloss = TxPower\ Level - RSSI\ of\ the\ inquiry\ response\ packet$$

For example, if Tx Power Level=+4 (dBm) and the RSSI on the received packet is −60 (dBm) then the total pathloss is +4−(−60)=+64 dB. If a second packet were received at −40 dBm with a Tx Power Level data=+15 dBm the resulting pathloss would be +55 dB. An application may use these pathloss values to choose which device it thinks might be closer (the one with the lower pathloss value).

Unfortunately, due to fading and varying antenna, circuit, and chip characteristics, these resulting pathloss values may have some uncertainty. Some of the uncertainty (for example, due to fading) may be able to be alleviated if multiple packets are received from the same device.

2. Bluetooth™ Host Controller Interface

The Bluetooth™ radio in a device may include the host controller interface that provides a command interface between the host application in the device and the link layer of the Bluetooth™ radio, also referred to as the controller, to enable access to hardware status and control registers of the Bluetooth™ radio.

The host controller interface (HCI) is described in the Bluetooth™ Core 4.0 Specification. The Host will receive asynchronous notifications of HCI events from Host Controller Transport Layer. HCI events are used for notifying the Host when something occurs. When the Host discovers that an event has occurred, it will then parse the received event packet to determine which event occurred. The commands and events are sent between the Host and the Controller. These are grouped into logical groups by function.

The HCI provides a command interface between the host application in a device and the Bluetooth™ link layer, provides access to hardware status and control registers of the Bluetooth™ radio, and provides a uniform method of accessing the Bluetooth™ baseband capabilities.

Discovery Phase HCI Commands and Events

HCI LE Advertising Report Event

The Bluetooth LE device discovery group of commands and events allow a device to discover other devices in the surrounding area. The Bluetooth LE host controller interface includes the HCI LE Advertising Report event that indicates that a Bluetooth device or multiple Bluetooth devices have been detected during an active scan or during a passive scan.

The scanning device may ask further information of advertising device with scan request packet. Once advertiser has received scan request packet it may answer with scan response packet.

Connection Phase HCI Commands and Events

HCI LE Read Advertising Channel Tx Power Command

The TX Power Level is reported to the host in response to the HCI LE Read Advertising Channel Tx Power Command. The TX Power Level data field may be used to calculate path loss of a received packet when the receiving device measures the RSSI of the received advertising packet.

After the discovery phase is completed, once a Bluetooth device is connected to another Bluetooth device, the received signal strength indication (RSSI) may be used by a receiving device to monitor the received power level of the data communication packets received over the connection. The RSSI value is calculated by the Bluetooth physical layer, and may be read by the host application through the host controller interface (HCI) Read RSSI command.

The Read RSSI command will read the value of the received signal strength indication (RSSI) for data communication packets received over the connection to another Bluetooth controller. The RSSI value is referenced with respect to a Connection_Handle that identifies the connection and is assigned when the connection is created. The Connection_Handle is used by the Bluetooth controller to determine which set of buffers to use and the logical link over which the data is to be sent.

The RSSI parameter in the Read RSSI command is a signed 8-bit value, and is interpreted as an indication of arriving signal strength at the antenna measured in dBm. This command reads the Received Signal Strength Indication (RSSI) value from the Controller. For Bluetooth LE transport, a Connection_Handle is used as the Handle command parameter and return parameter. The meaning of the RSSI metric is an absolute receiver signal strength value in dBm to ±6 dBm accuracy.

3. Bluetooth LE Proximity Profile

The Proximity Profile defines the behavior when a device moves away from a peer device so that the connection is dropped or the path loss increases above a preset level, causing an immediate alert. This alert may be used to notify the user that the devices have become separated. As a consequence of this alert, a device may take further action, for example to lock one of the devices so that it is no longer usable.

The Proximity Profile may also be used to define the behavior when the two devices come closer together such that a connection is made or the path loss decreases below a preset level.

The Proximity Profile defines two profile roles to enable devices to detect their proximity: the Proximity Reporter and the Proximity Monitor. The Proximity Reporter is a Generic Attribute Profile (GATT) server on the one device in the connection, which supports a Link Loss Service (mandatory), an Immediate Alert Service (optional), and a transmit (Tx) Power Service (optional). The Proximity Monitor is a GATT client on the peer device in the connection, which monitors the Radio Signal Strength Information (RSSI) of the connection to calculate the signal's path loss. The Proximity Monitor may use the information received from the Proximity Reporter's Tx Power Service to normalize the RSSI value, by subtracting the RSSI from the Tx Power Level. In order to trigger an alert on low RSSI, the Proximity Monitor constantly monitors RSSI.

The Proximity Monitor on one device may maintain a connection with the Proximity Reporter on the peer device and monitor the RSSI of this connection. The Proximity Monitor may calculate the path loss by subtracting the RSSI from the transmit power level of the device of the Proximity Reporter, as discovered using the Reading Tx Power procedure. If the path loss exceeds a threshold set on the Proximity Monitor, it may write in the Alert Level characteristic of the Immediate Alert service, using the GATT Write Without Response sub-procedure, to cause the Proximity Reporter to generate an alert. The Proximity Monitor may also generate an alert when the path loss exceeds the threshold. The duration of the alert may be implementation specific.

The Proximity Monitor specified in the Bluetooth Proximity Profile, may include the following functions:
Service Discovery from the peer device;
Characteristic Discovery from the peer device;
Configuration of Alert on Link Loss to the peer device;
Alert on Link Loss to the peer device;
Reading Tx Power from the peer device; and
Alert on Path Loss locally and to the peer device based on RSSI supervision.

If the path loss falls below a threshold set on the Proximity Monitor it may write in the Alert Level characteristic of the Immediate Alert service, using the GATT Write Without Response sub-procedure, to cause the Proximity Reporter to end the alert. When the path loss is below the threshold the Proximity Monitor should stop alerting.

If link loss occurs during this procedure, then the behavior defined in the Alert on Link Loss procedure may be used.

E. Improving Security of Proximity Based Pairing

Touch-to-Select (T2S) is a technology where the received signal strength is utilized as an indicator to trigger actions between the devices in proximity. The technology enables devices that may have not been previously paired to start interacting after these devices have been taken within the a priori decided distance. The challenge with the signal strength based indication of the proximity is the error proneness of the process. This is especially crucial in applications such as payments or personal identification requiring high reliability.

Touch-to-Select (T2S) utilizes device proximity as a trigger for action. The proximity is measured utilizing received signal strengths. The challenge is that since the accurate propagation conditions between the transmitter and receiver cannot be estimated and the transmission power is not always known, the process is vulnerable to attacks. One example of such attack is transmitter having much higher transmission power level than typical transmitter or one that is indicating its transmission power lower than it actually is. This will cause error in link loss calculation and thus the set RSSI threshold to be exceeded, even if the actual transmitter is not within proximity of the receiver. Equally, if the user holds her hand on top of the user's device antenna that performs the signal strength measurement, the received signal strength is significantly reduced and the proximity may not be detected at all, due to the signal strength loss caused by the hand. The same applies also for covering the transmitting antenna by hand or any other obstacles.

In accordance with an example embodiment of the invention, the signal propagation characteristics are utilized as part of the Touch-to-Select (T2S) event, to remove errors due to objects blocking the antennas and/or accurately detect the proximity to the transmitter. This is achieved by taking several RSSI measurements at different distances and by comparing the results with a propagation model based signal strength estimates.

In accordance with an example embodiment of the invention, when the user's device is about to perform the Touch-to-Select (T2S) based interaction requiring additional security, the system behaves as with normal Touch-to-Select (T2S) until the signal strength threshold triggering Touch-to-Select (T2S) is achieved. Once this happens, either the user's device or the other device may indicate that it requests secure action. For example, when initiating or receiving a secure payment request, the device may increase the amount of transmissions (or increase the probability for more transmissions) to increase the number of following RSSI measurements. Next, the device having any form of capability to guide the user, either by voice prompts, display, lights, or the like, prompts the user to move one of the devices either towards or further from the other.

While moving, the RSSI values are measured continuously and monitored against the expected signal strength values. The comparison may be based either on absolute values, or relative values, taking into account the potential fixed attenuation caused e.g. by user's hand. When the desired RSSI behavior is detected, the successful detection is indicated both to the user and over the radio link to the peer device.

The signal strength in open, free space propagation environment attenuates along the distance based on free space loss. The loss can calculated based on Eq. 1.

$$L = 20\log_{10}\left(\frac{4\pi d}{\lambda}\right) \quad \text{(Eq. 1)}$$

Based on this, the device may calculate the estimates for the received signal strengths at different distances and power levels, as a signal strength map that is stored in the device. The signal strength map serves as a reference of the predetermined behavior expected for signal strength as distance varies. For example, if the distance between the devices increases, the predetermined behavior is that the measured signal strength values are expected to decrease.

For example, if the detected proximity of an intended device is 10 cm based on the RSSI measurement at one distance, it is possible that a masquerading device transmitting with higher power levels could erroneously be interpreted to be the intended device in proximity. The intended device with a 10 dBm output power level produces a similar RSSI value at a 10 cm distance as does the masquerading device with a 30 dBm output power level at a 1 m distance. With only a single measurement of the RSSI, it is impossible to detect the difference between a connection to the intended device and a connection to the masquerading device.

However, if the device performing the measurement is moved either closer or further away from the intended device, and the RSSI measurement is repeated while the distance changes between the devices, the identity of the connected device becomes definite. For example, if the RSSI measurement is repeated at a 30 cm distance, the 10 dBm transmitter provides a signal strength of −19.8 dBm and the 30 dBm transmitter (actually being now anywhere between 80 cm and 1.2 meters away) provides RSSI values within range [−8 . . . −11.8] dBm.

In accordance with an example embodiment of the invention, repeating the RSSI measurement at different distances while being in proximity, provides the information required to distinguish between the intended and the masquerading devices. In addition, if there is a fixed attenuation (such as the user's hand blocking the antenna), the signal strength curves are merely shifted down by the amount of the attenuation, but the difference of the signal strengths between the measurements performed at the different distances remains constant.

In accordance with an example embodiment of the invention, the specific nature of the signal propagation loss in "near" field is utilized, where the signal strength decays very rapidly as a function of the increased distance.

The distance between the devices is estimated using the measured signal strength or RSSI. For example, the user's device may determine whether the measured RSSI of the exchanged messages satisfies a predetermined behavior, wherein changes in the RSSI follow the stored "signal strength map" of a proximate device when it is moved). It is true that the variables of the "signal strength map" are RSSI and distance, but somehow the claim is not very clear.

Utilization in Touch-to-Select (T2S)

In accordance with an example embodiment of the invention, when user is about to perform device pairing utilizing Touch-to-Select (T2S) based interaction, the system behaves as with standard Touch-to-Select (T2S) until the signal strength threshold triggering Touch-to-Select (T2S) is achieved. Once this happens, either of the devices can indicate that they request secure action. For example when initiating or receiving this secure payment request, the device may increase the amount of transmissions (or increase the probability for more transmissions) to increase the number of following RSSI measurements. Next, the device having any form of capability to guide the user, either by voice commands, display, lights, or similar, instructs the user to move one of the devices either towards or further away. While moving, the RSSI values are measured continuously and monitored against the expected signal strength values. The comparison can be based either on absolute values, or relative values taking into account the potential fixed attenuation caused e.g. by user's hand. When the desired RSSI behavior is detected, the successful detection is indicated both to the user and over the radio link to the peer device. In case the detection is not successful, the system may ask the user to repeat the process.

Similarly to the moving of the device towards or away from each other, the interaction can be any other known distance manipulation (like rotating the device, flipping it . . . ).

FIG. 1A is an illustration of an example embodiment of a network in a device discovery phase, with a mobile wireless device 100 detecting wireless device discovery messages 150 received from a wireless service device 102, wherein the mobile wireless device 100 is located at a first distance X1 from the wireless service device 102, in accordance with at least one embodiment of the present invention.

The mobile wireless device 100 is scanning for device discovery messages 150 associated with the presence of the wireless service device 102. In an example embodiment of the invention, the wireless device discovery messages 150 may be a Bluetooth™ inquiry response message transmitted by the wireless service device 102 in response to an inquiry message transmitted by the mobile wireless device 100. In an example embodiment of the invention, the wireless device discovery messages 150 may be a Bluetooth™ Low Energy advertising message transmitted by the wireless service device 102.

In example embodiments of the invention, the mobile wireless device 100 may perform:

[1] scanning for discovery messages;
[2] identify target service device 102; and
[3] instruct user to move toward device 102 to perform Touch-to-Select.

Figure 7:
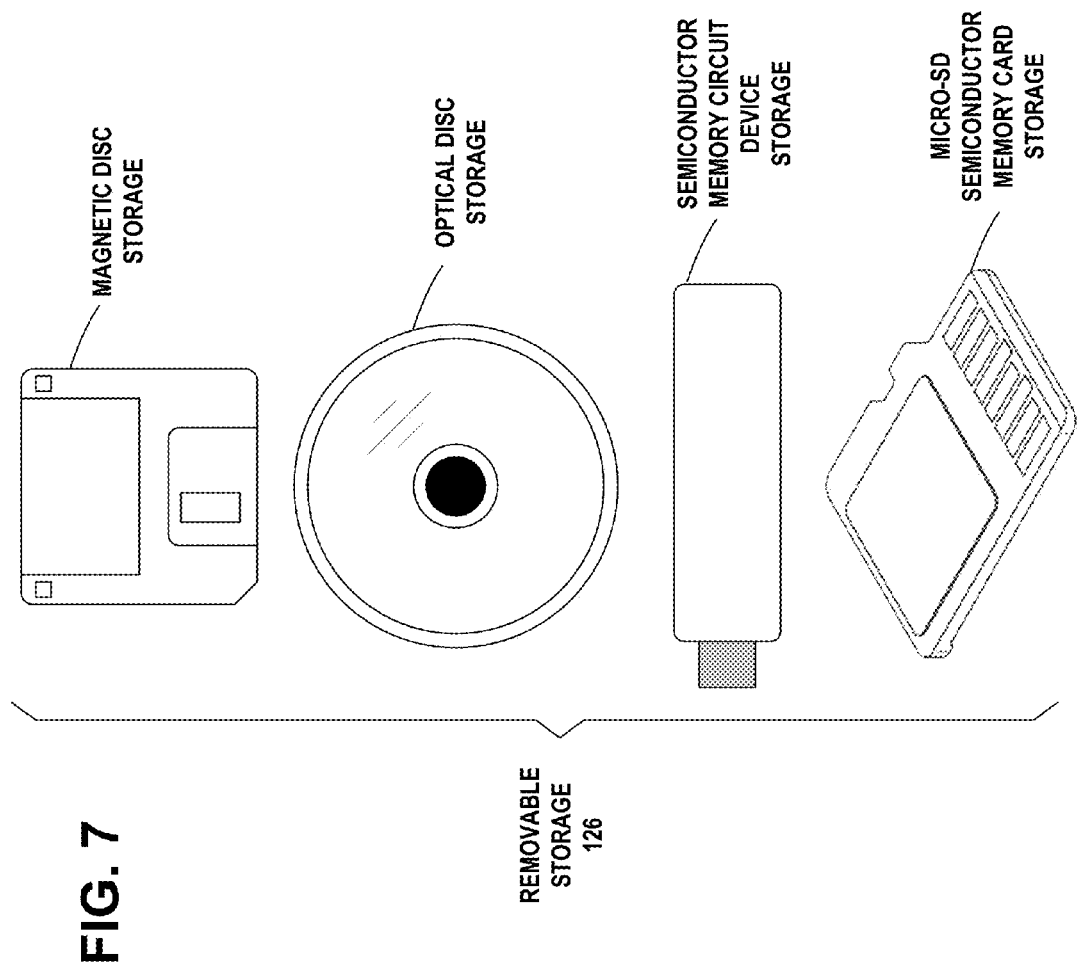
FIG. 7 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In example embodiments of the invention, the mobile wireless device 100 and the wireless service device 102 may include a processor 122 that includes from one to many central processing units (CPUs) 124 and/or 125, a random access memory (RAM) 126, a read only memory (ROM) 127, and interface circuits 128 to interface with one or more radio transceivers 116, antenna 132 170, and battery or house power sources. A smart phone may include a keypad, display 144, etc. The RAM and ROM can be removable memory devices such as smart cards, SIMs, WIMs, semiconductor memories such as RAM, ROM, PROMS, flash memory devices, etc., as shown in FIG. 7.

In an example embodiment of the invention, the Bluetooth mobile wireless device 100 and the wireless service device 102 may include control stack 115 that includes a host controller interface (HCI) 111 that provides a command interface between the host respective application 110, 110A in the device and the link layer or MAC 114. The control stack 115, also referred to as the controller, to enables access to hardware status and control registers of the Bluetooth radio 116. The host controller interface (HCI) is described in the Bluetooth™ Core Specification. The Host application 110, 110A will receive asynchronous notifications of HCI events from HCI 111. HCI events are used for notifying the Host application 110, 110A when something occurs. When the Host application discovers that an event has occurred, it will then parse the received event packet to determine which event occurred. The commands and events are sent between the Host application 110, 110A and the radio 116. The HCI 111 provides a command interface between the host application 110, 110A in a device and the Bluetooth link layer or MAC 114, provides access to hardware status and control registers of the radio 116, and provides a uniform method of accessing the Bluetooth baseband capabilities. In an example embodiment of the invention, the MAC 114 may be the Bluetooth basic rate/enhanced data rate (BR/EDR) protocol, the Bluetooth Low Energy (LE) protocol, or both protocols.

In an example embodiment of the invention, the wireless service device 102 outputs Bluetooth LE advertising packets on the advertising PHY channels in advertising events. During Bluetooth LE transmission, the RF signal is transmitted by the antenna 170.

In another example embodiment of the invention, the wireless service device 102 outputs Bluetooth protocol data units (PDU) or packets, such as inquiry response packets and extended inquiry response (EIR) packets 150, for Bluetooth transmission. During Bluetooth transmission, the RF signal is transmitted by the antenna 170.

In an example embodiment of the invention, the mobile wireless device 100 may be, for example, a miniature device such as a key fob, smart card, jewelry, or the like. In an example embodiment of the invention, the mobile wireless device 100 may be, for example, a relatively larger cell phone, smart phone, flip-phone, PDA, graphic pad. The mobile wireless device 100 may also be in an automobile or other vehicle.

Figure 1B:
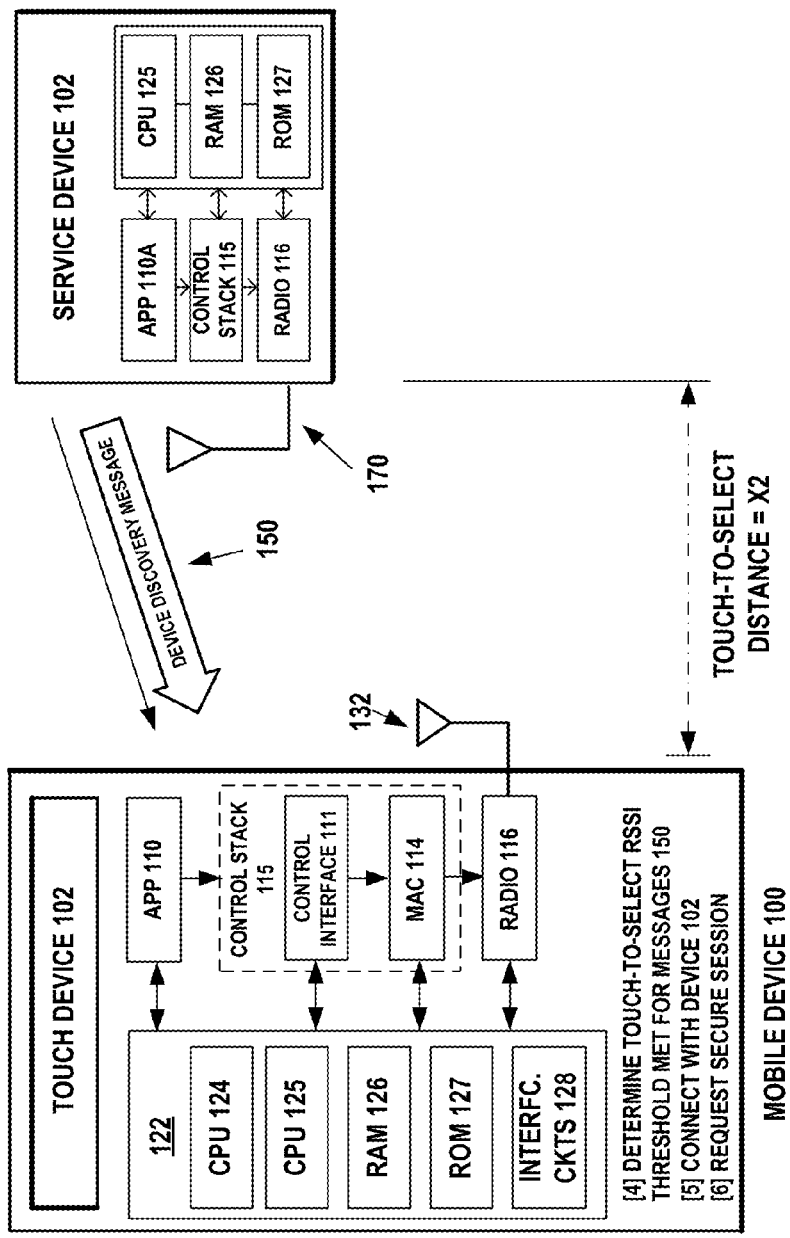
FIG. 1B is an illustration of an example embodiment of the network of FIG. 1A, wherein the mobile wireless device has moved closer to the wireless service device, measures the RSSI of the wireless device discovery messages that it receives, and performs a touch-to-select event that initiates a communication connection to the wireless service device. The mobile wireless device commences exchanging wireless connection messages with the wireless service device and then requests a secure communications session with the wireless service device, in accordance with at least one embodiment of the present invention.

FIG. 1B is an illustration of an example embodiment of the network of FIG. 1A, wherein the mobile wireless device 100 measures the RSSI of the wireless device discovery messages 150 that it receives. The mobile wireless device 100 has moved to within a distance X2 of the wireless service device 102 and performs a touch-to-select event 20 that initiates a communication connection to the wireless service device 102. The mobile wireless device 100 commences exchanging wireless connection messages 176A and 176B, shown in FIG. 1C, with the wireless service device 102. The mobile wireless device 100 then requests a secure communications session with the wireless service device 102, in accordance with at least one embodiment of the present invention.

In example embodiments of the invention, the mobile wireless device 100 may perform:

[4] determine touch-to-select RSSI threshold met for messages 150;

[5] connect with device 102; and

[6] request secure session.

Figure 1C:
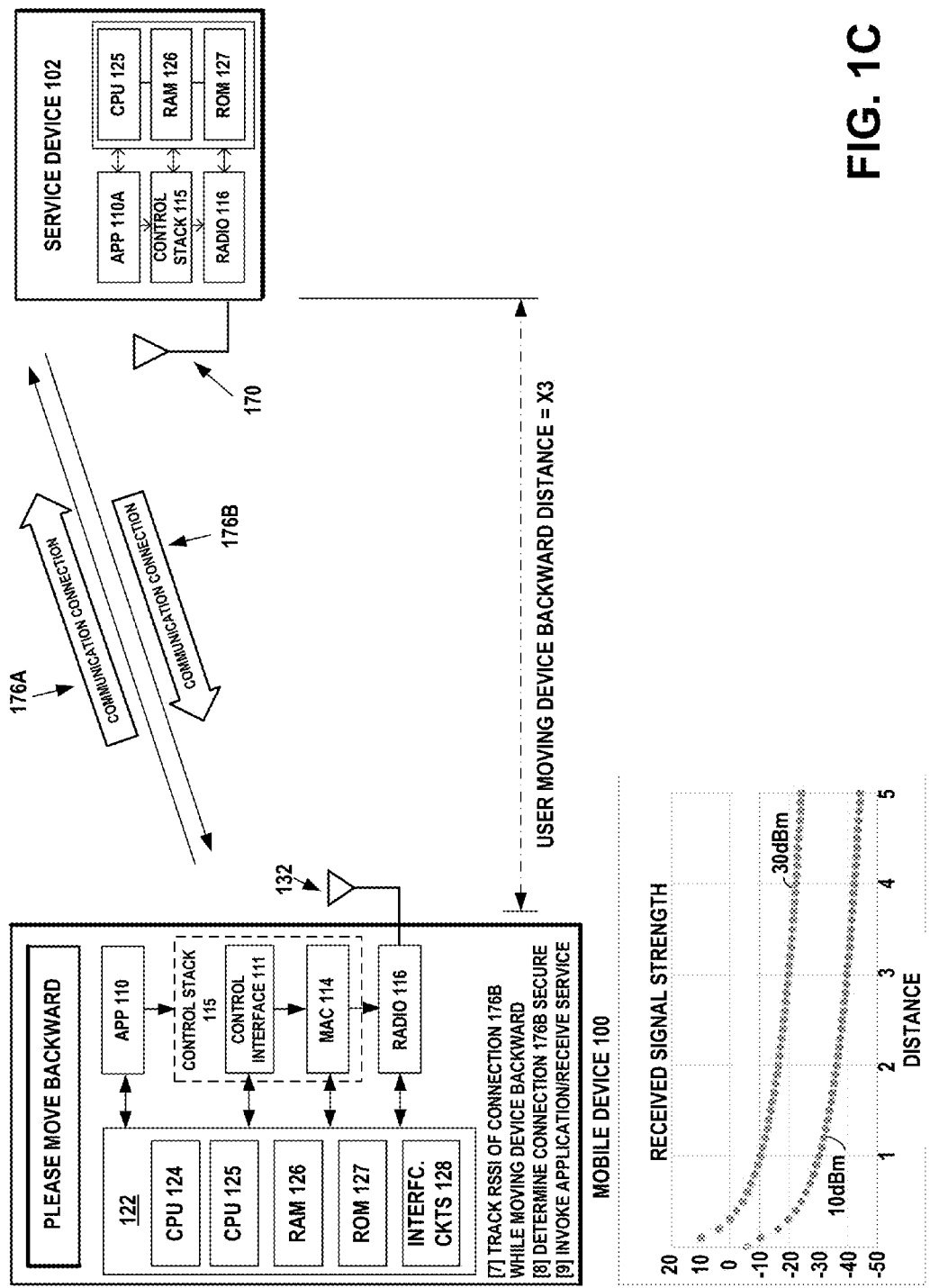
FIG. 1C is an illustration of an example embodiment of the network of FIG. 1B, wherein to insure that the wireless connection is actually the intended connection with the wireless service device and is not mistaken for an unintended connection with another wireless device, the mobile wireless displays a prompt to its user to move the device backward, away from the wireless service device. The mobile wireless device then measures and tracks the RSSI of the received wireless communications messages from the wireless service device, while the distance between the two devices increases. The mobile wireless device determines whether the estimated increasing distance to the wireless service device satisfies a predetermined behavior expected for signal strength as distance varies. The mobile wireless device will invoke and execute a secure application, if the estimated increasing distance to the wireless service device that it has measured and tracked, satisfies the predetermined behavior expected for signal strength as distance varies. In embodiments of the invention, the mobile wireless device and the wireless service device may increase the quantity of the wireless connection messages that they exchange, to increase the number of RSSI measurements, so as to enhance the determining whether the predetermined behavior expected for signal strength as distance varies is satisfied.

FIG. 1C is an illustration of an example embodiment of the network of FIG. 1B, wherein so as to insure that the wireless connection is actually the intended connection with the wireless service device 102 and is not mistaken for an unintended connection with another wireless device, the mobile wireless device 100 displays a prompt to its user to move the device 100 backward, away from the wireless service device 102. The mobile wireless device 100 then measures and tracks the RSSI of the received wireless communications messages 176B from the wireless service device 102, while the distance between the two devices increases. The mobile wireless device 100 determines whether the estimated increasing distance to the wireless service device 102 satisfies a predetermined behavior expected for signal strength as distance varies, i.e. between increasing distance and the RSSI of the received wireless communication messages 176B. The mobile wireless device 100 will invoke and execute a secure application, if the estimated increasing distance to the wireless service device 102 that it has measured and tracked, satisfies the predetermined behavior expected for signal strength as distance varies.

The figure includes a graph of RSSI vs separation distance. If the mobile wireless device 100 detects the proximity (e.g. 10 cm) of a transmitter based on an RSSI measurement at only one distance, it is possible that another wireless device transmitting with higher power levels, may erroneously be interpreted to be the wireless service device 102 in proximity. The wireless service device 102 with 10 dBm output power level produces a similar measured RSSI value at 10 cm distance than another, unintended wireless device with 30 dBm output power level produces from a 1 m distance. With only a single measurement, it is impossible to detect the difference between the two transmitters.

If the mobile wireless device 100 performing the RSSI measurement is moved either closer or farther away from the intended wireless service device 102, and the RSSI measurement is repeated, there is no ambiguity in identifying the actual transmitting device. If the measurement is now repeated at 30 cm distance, the 10 dBm transmitter provides signal strength of −19.8 dBm and the unintended 30 dBm transmitter (actually being now anywhere between 80 cm and 1.2 meters away) provides RSSI values within range [−8 . . . −11.8] dBm, which easily distinguishes the intended device 102 from the unintended device.

In accordance with an example embodiment of the invention, repeating the RSSI measurement with at least two different distances while being in proximity, provides the information required to distinguish between devices. In addition, if there is a fixed attenuation (such as the user's hand), the signal strength curves are merely shifted down by the amount of the attenuation, but the difference of the signal strengths between the measurements performed at the different distances remains constant.

In embodiments of the invention, the mobile wireless device 100 and the wireless service device 102 may increase the quantity of the wireless connection messages 176A and 176B that they exchange, to increase the number of RSSI measurements, so as to enhance the determining whether the predetermined behavior expected for signal strength as distance varies is satisfied.

In example embodiments of the invention, the mobile wireless device 100 may perform:

[7] track RSSI of connection 176B while moving device backward;

[8] determine connection 176B is secure; and

[9] invoke a secure application and receive service from wireless service device 102.

Figure 1D:
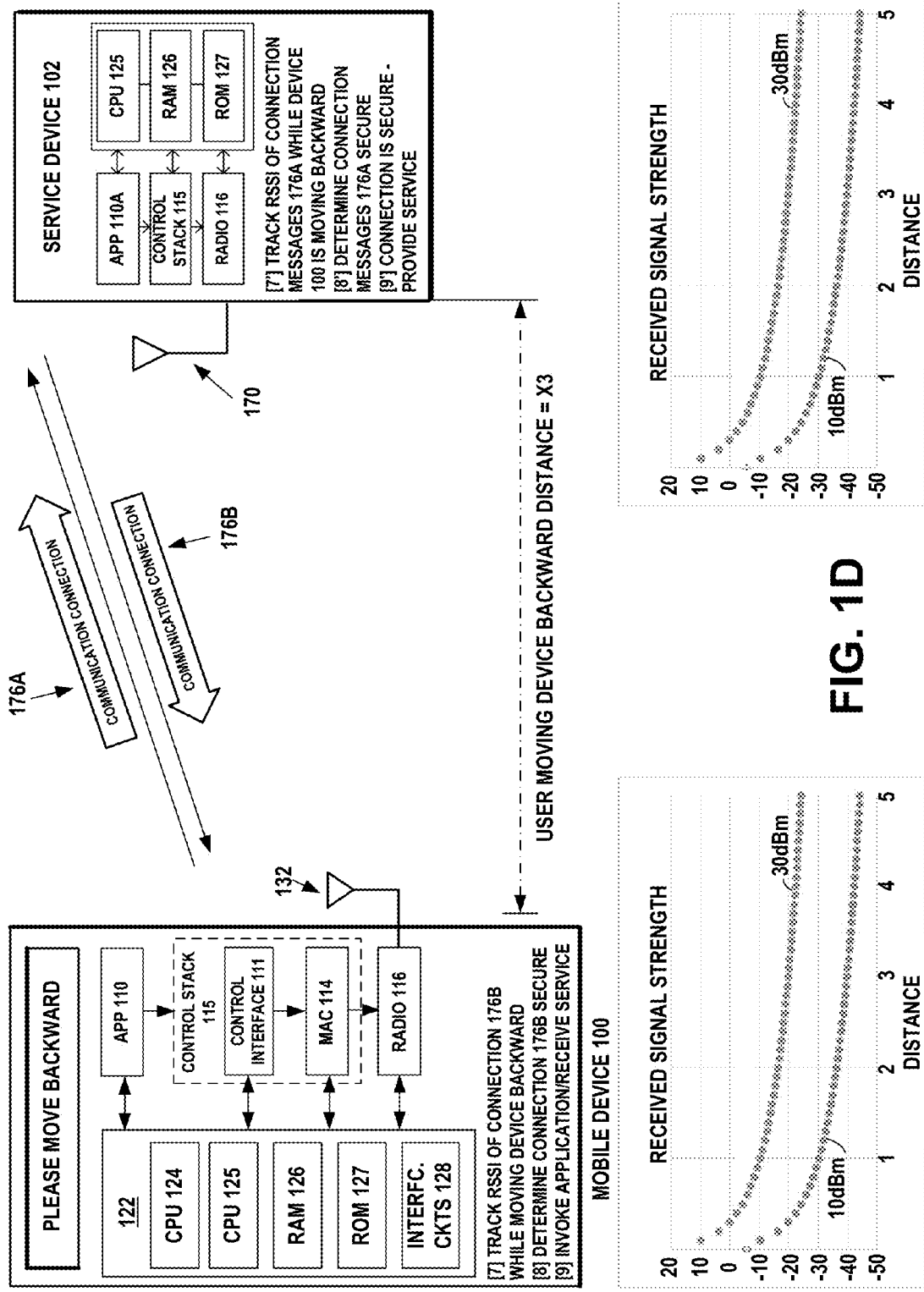
FIG. 1D is an illustration of an example embodiment of the network of FIG. 1C, wherein the wireless service device responds to the request for a secure communications session, by also measuring and tracking the RSSI of wireless communications messages that it receives from the mobile wireless device, while the distance between the two devices increases. The wireless service device also determines whether the estimated increasing distance between the devices satisfies the predetermined behavior expected for signal strength as distance varies. The wireless service device will invoke and execute a secure application, if the estimated increasing distance between the devices that it has measured and tracked, satisfies the predetermined behavior expected for signal strength as distance varies. In embodiments of the invention, the wireless service device and the mobile wireless device may increase the quantity of the wireless connection messages that they exchange, to increase the number of RSSI measurements, so as to enhance the determining by the wireless service device, whether the predetermined behavior expected for signal strength as distance varies is satisfied. The wireless service device and the mobile wireless device may signal to each other their respective determinations as to whether the predetermined behavior expected for signal strength as distance varies is satisfied.

FIG. 1D is an illustration of an example embodiment of the network of FIG. 1C, wherein the wireless service device 102 responds to the request for a secure communications session, by also measuring and tracking the RSSI of wireless communications messages 176A that it receives from the mobile wireless device 100, while the distance between the two devices increases. The wireless service device 102 also determines whether the estimated increasing distance X3 between the devices satisfies the predetermined behavior expected for signal strength as distance varies, i.e., between increasing distance and the RSSI of the received wireless communication messages 176A. The wireless service device 102 will invoke and execute a secure application, if the estimated increasing distance between the devices that it has measured and tracked, satisfies the predetermined behavior expected for signal strength as distance varies.

In embodiments of the invention, the wireless service device 102 and the mobile wireless device 100 may increase the quantity of the wireless connection messages 176A and 176B that they exchange, to increase the number of RSSI measurements, so as to enhance the determining by the wireless service device 102, whether the predetermined behavior expected for signal strength as distance varies is satisfied. The wireless service device 102 and the mobile wireless device 100 may signal to each other their respective determinations as to whether the predetermined behavior expected for signal strength as distance varies is satisfied.

In example embodiments of the invention, the wireless service device 102 may perform:

[7'] track RSSI of connection messages 176A while device 100 is moving backward;

[8'] determine connection messages 176A are secure; and

[9'] if connection is secure, then provide secure service.

In an example use case, a mobile device 100 is using Touch-to-Select to select payment device 102. The device 100 guides the user to touch the payment device 102, after device 102 is selected with Touch-to-Select, device 100 will guide the user to pull away device 100. This movement can be calculated with the measured RSSI, as described. The user of the device 100 wishes to pay and activates a payment application. The payment application searches for the payment device 102 by scanning Bluetooth LE devices that have a known universally unique identifier (UUID) in the advertisement field of an advertising packet. The payment device 102 advertises itself with this UUID in its advertisement field. When device 100 finds an advertisement having this known UUID, device 100 prompts the user to move closer to the payment device, for example displaying the message "Touch Device". When device 100 touches the payment device 102, the signal strength of the advertising packets from the device 102 are sufficiently high to trigger the Touch-to-Select event in device 100, causing device 100 to create a connection to device 102. Once the connection is created, device 100 prompts the user to move his mobile device 100 away. Now either or both device 100 and/or device 102 may measure the RSSI of the data connection packets while the distance between the devices increases, in order to be certain that device 102 is the intended payment device with which to be connected.

In an example embodiment of the invention, data may be exchanged with a selected device after the touch-to-select event, without creating a connection with that device. The mobile device 100 and the service device 102 may communicate with each other using discovery messages, for example by alternating their scanning and advertising states, so that advertising data may be sent in both directions. After the mobile device 100 determines that the service device 102 is in close proximity, by using touch-to-select, the mobile device 100 and the service device 102 may exchange additional wireless discovery messages, for example by sending advertising data in both directions.

In an example embodiment of the invention, the service device 102 may use wireless discovery messages received from the mobile device 100, such as scan request packets, to measure the signal strength and determine the identity of the sender of the wireless discovery messages received from the mobile device 100.

In an example embodiment of the invention, the data exchanged by sending advertising data in both directions, may be used to configure advertising parameters, for example by making service device 102 transmit advertising packets more rapidly, such as when a touch-to-select event has occurred. This makes it possible to follow the signal characteristics of service device 102 more accurately.

Figure 2:
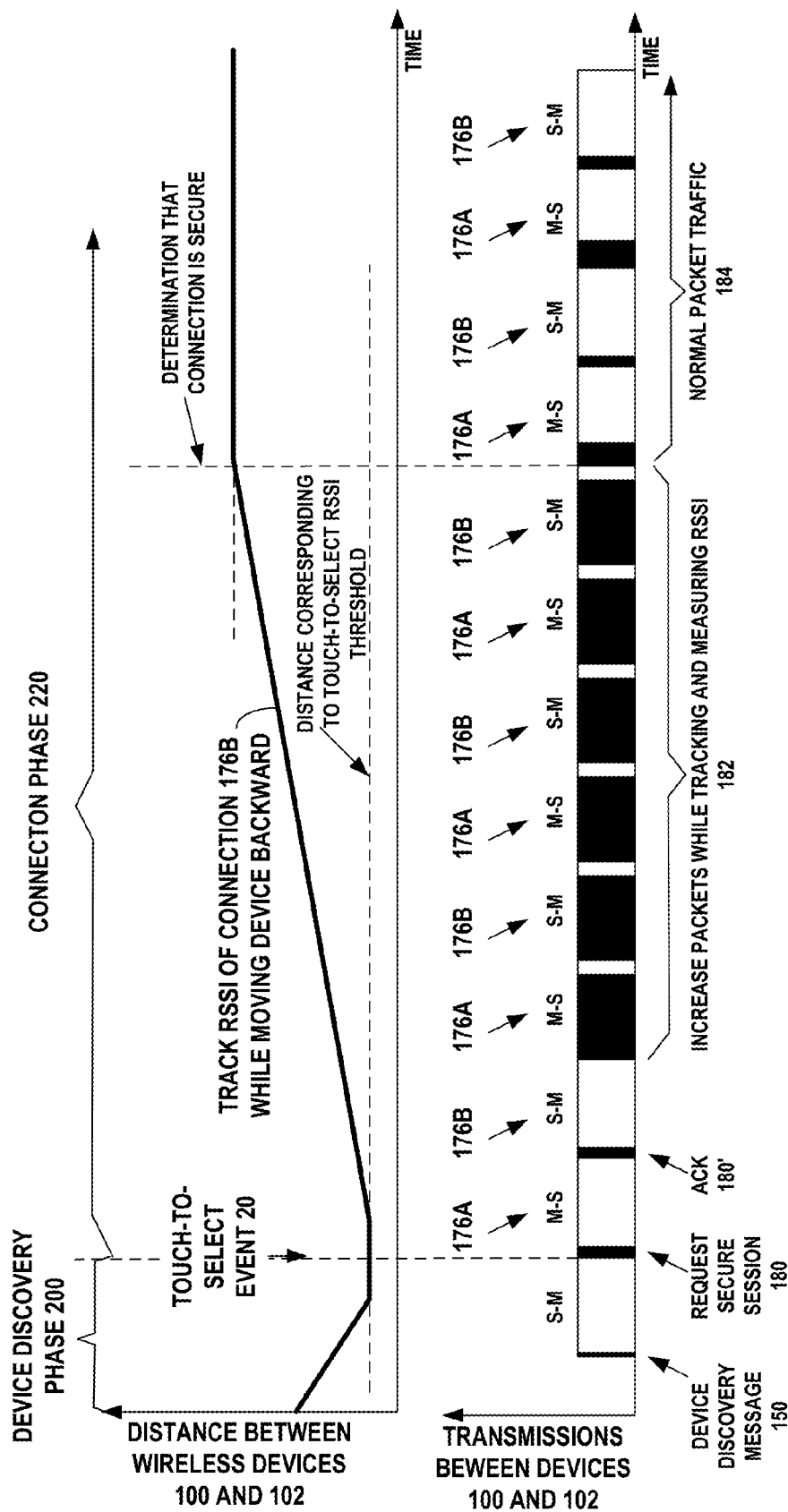
FIG. 2 is a timing diagram illustrating the touch-to-select event that initiates a communication connection between the wireless devices, the request for a secure communications session, the measuring and tracking by the mobile wireless device of the RSSI of the received wireless communications messages while the distance between the two devices increases, and the increase in the quantity of the wireless connection messages that are exchanged, to increase the number of RSSI measurements, so as to enhance the determining whether the predetermined behavior expected for signal strength as distance varies is satisfied.

FIG. 2 is a timing diagram illustrating the discovery phase 200 during which device discovery messages 150, such as Bluetooth inquiry response packet or Bluetooth LE advertising packets, transmitted by the wireless service device 102, are received by the mobile wireless device 100. The mobile wireless device 100 measures the RSSI of the wireless device discovery messages 150 that it receives. When the mobile wireless device 100 has moved sufficiently close to the wireless service device 102, it performs a touch-to-select event 20 that initiates a connection phase 220 wherein a communication connection is made to the wireless service device 102. Then the mobile wireless device 100 sends a request message 180 for a secure communications session, to the wireless service device 102. The wireless service device 102 replies with an acknowledgement message 180'.

The mobile wireless device 100 displays a prompt to its user to move the mobile wireless device 100 backward, away from the wireless service device 102. In embodiments of the invention, the mobile wireless device 100 and the wireless service device 102 may increase the quantity of the wireless connection messages 176A and 176B that they exchange during an interval 182, to increase the number of RSSI measurements, so as to enhance the determining whether the predetermined behavior expected for signal strength as distance varies is satisfied. For example, the mobile wireless device 100 and the wireless service device 102 may disable any low activity modes and thus transmit a packet in every time slot.

The mobile wireless device 100 measures and tracks the RSSI of the received wireless communications messages 176B from the wireless service device 102, during the interval 182 while the distance between the two devices increases. The mobile wireless device 100 determines whether the estimated increasing distance to the wireless service device 102 satisfies a predetermined behavior expected for signal strength as distance varies, i.e., between increasing distance and the RSSI of the received wireless communication messages 176B.

When the mobile wireless device determines that the estimated increasing distance to the wireless service device 102, satisfies the predetermined behavior expected for signal strength as distance varies, then the mobile wireless device 100 will invoke and execute a secure application and it will exchange normal packet traffic with the wireless service device 102 thereafter at 184.

Figure 3:
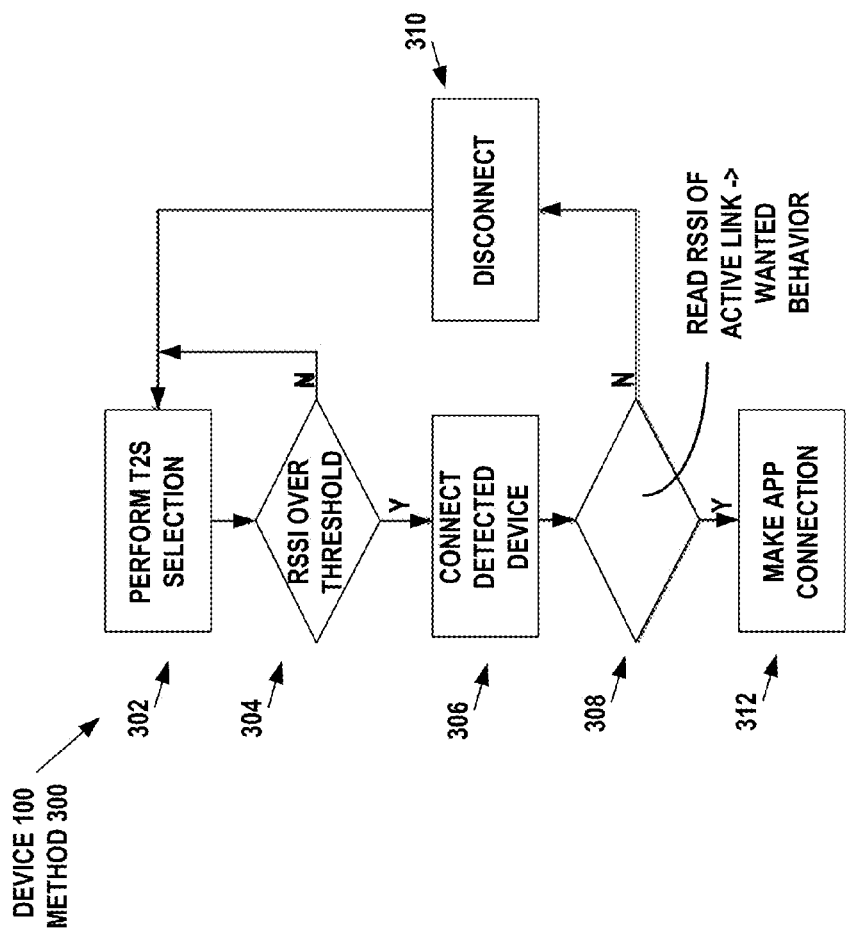
FIG. 3 is an example flow diagram for the mobile wireless device, in accordance with at least one embodiment of the present invention.

FIG. 3 is an example flow diagram 300 for the mobile wireless device, in accordance with at least one embodiment of the present invention. Device 100 is trying to make a secure selection of device 102. In step 302 device 100, which is capable of Touch-to-Select operation, starts the Touch-to-Select process. In step 304, when device 100 measures an RSSI of a device discovery message 150 from device 102, which is over a predefined threshold, device 100 connects to device 102 in step 306. This connection is not an application level connection, but is some general attribute connection that does not have a security requirement. With this connection, device 100 may measure the RSSI of data connection packets from device 102 multiple times per second, in step 308. Device 100 analyses the measured RSSI values according to certain signal level changes. In addition, device 102 may analyze the RSSI of the same connection and accept secure connection of the device 100, if the RSSI satisfies a predetermined behavior expected for signal strength as distance varies. If wanted signal level change is found, the actual application level connection (secure connection) is established in step 312. If not, device 100 is disconnected in step 310 and continues the Touch-to-Select process.

Figure 4:
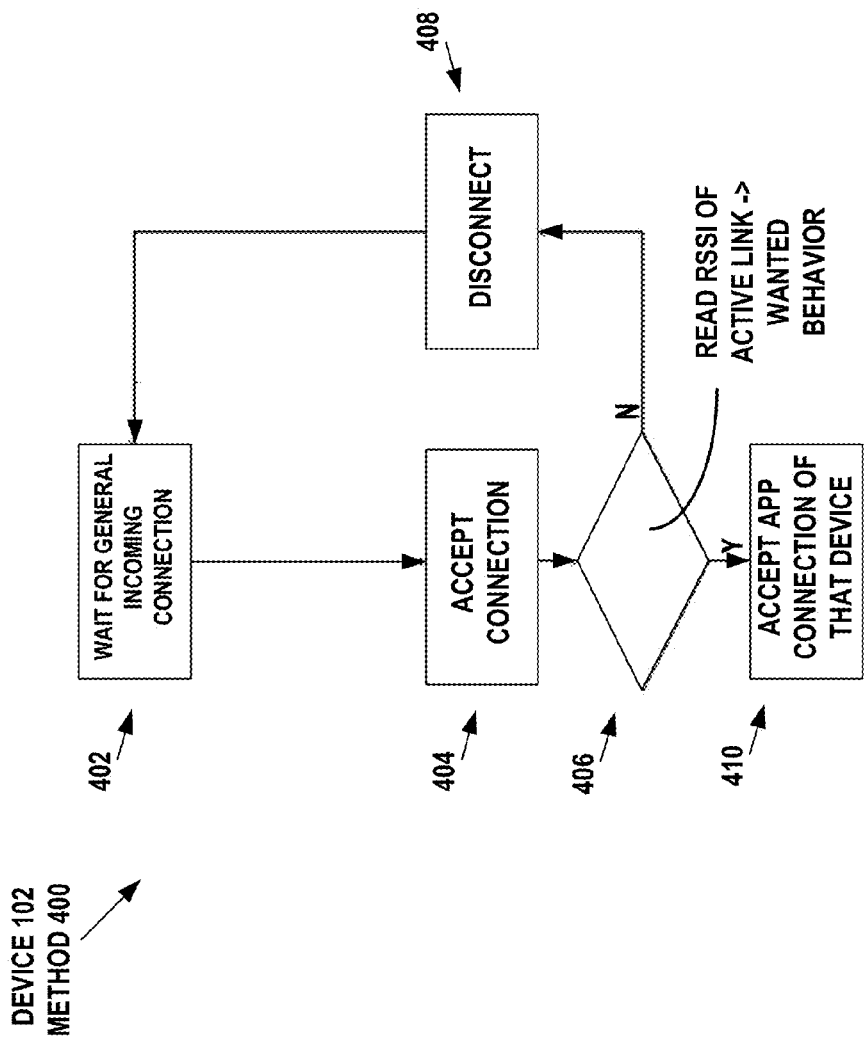
FIG. 4 is an example flow diagram for the wireless service device, in accordance with at least one embodiment of the present invention.

FIG. 4 is an example flow diagram 400 for the wireless service device 102, in accordance with at least one embodiment of the present invention. In step 402, the wireless service device 102 waits for a general incoming connection. In step 404, the wireless service device 102 accepts the connection with device 100. In step 406, the wireless service device 102 reads the RSSI of the active link with device 100 and determines whether the RSSI satisfies a predetermined behavior expected for signal strength as distance varies. If the predetermined behavior expected for signal strength as distance varies is satisfied, then in step 410, the application connection is accepted for device 102. If not satisfied, then in step 408, the device 102 is disconnected from device 100.

Figure 5:
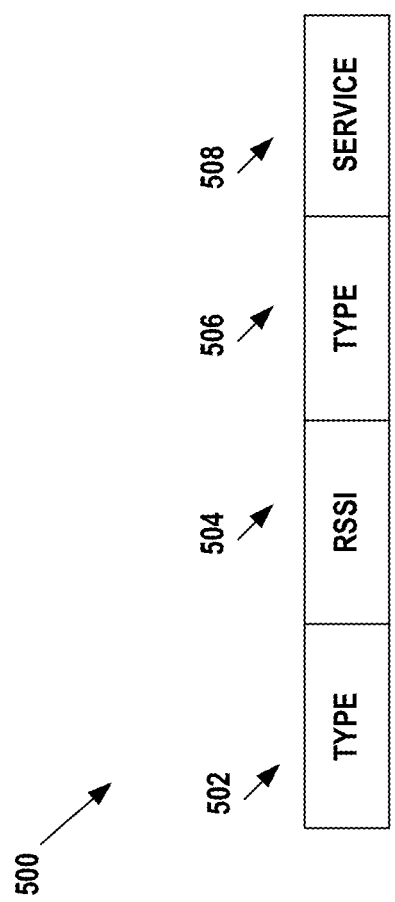
FIG. 5 is an example format diagram for a packet to indicate a required RSSI for service use, in accordance with at least one embodiment of the present invention.

FIG. 5 is an example format diagram 500 for an advertising packet from device 102, which indicates a required RSSI for service use, in accordance with at least one embodiment of the present invention. Field 502 specifies the type of information in the next field, i.e., RSSI requirement for service activation. Field 504 specifies the minimum RSSI necessary to authenticate data connection packets transmitted from the device 102. Field 506 specifies the type of information in the next field, i.e., service available from the device 102. Field 506 is the specification of the available service.

In an example embodiment of the invention, device 102 may advertises itself by using the format shown in FIG. 5. Device 100 may perform a selection of device 102 without the necessity of establishing a connection, by merely scanning advertising packets from device 102 and analyzing them and their RSSI level. Connection to device 102 may be established when specified RSSI of the advertising packets is found.

As shown in FIG. 5, the required RSSI threshold may be specified in the advertisement field, as well as the available service information. The specified RSSI threshold may be used to authenticate the advertising packet. In this manner, the payment device 102 may, for example, indicate that an RSSI of −40 dBm is required to initiate a secure payment process. When the mobile device 100 is performing a scan or inquiry process, it will determine that the payment device 102 may be used if the measured RSSI of the advertising packet is high enough. With this information, the mobile device 100 may display a prompt to the user, such as "Touch Device" and begin the Touch-to-Select process when measured RSSI is high enough (in this example, higher that −40 dBm). Now device 100 knows that it can make payment connection with payment device 192.

| Type field | Meaning | Value |
|---|---|---|
| 0xa1 | RSSI requirement for service activation | RSSI requirement in dBm |
| 0xa2 | Service that is activated with incoming connection above signal strength | Service ID |

FIG. 6A is an illustration of an example flow diagram 600 of an example process in the mobile device 102, in accordance with at least one embodiment of the present invention. The steps of the flow diagram represent computer code instructions stored in the RAM and/or ROM memory of the mobile device 100, which when executed by the central processing units (CPU) 125, carry out the functions of the example embodiments of the invention. The steps may be carried out in another order than shown and individual steps may be combined or separated into component steps. The flow diagram has the following steps:

Step 602: receiving, by an apparatus, one or more wireless discovery messages;

Step 604: determining, by the apparatus, whether a wireless device is in close proximity to the apparatus based on information obtained from the one or more received wireless discovery messages;

Step 606: exchanging, by the apparatus, messages with the wireless device in response to having determined that the wireless device is in close proximity to the apparatus;

Step 608: measuring, by the apparatus, signal strength of the exchanged messages while distance changes to the wireless device; and Step 610 determining, by the apparatus, whether changes in the measured signal strength of the exchanged messages satisfy a predetermined behavior expected for signal strength as distance varies.

Figure 6B:
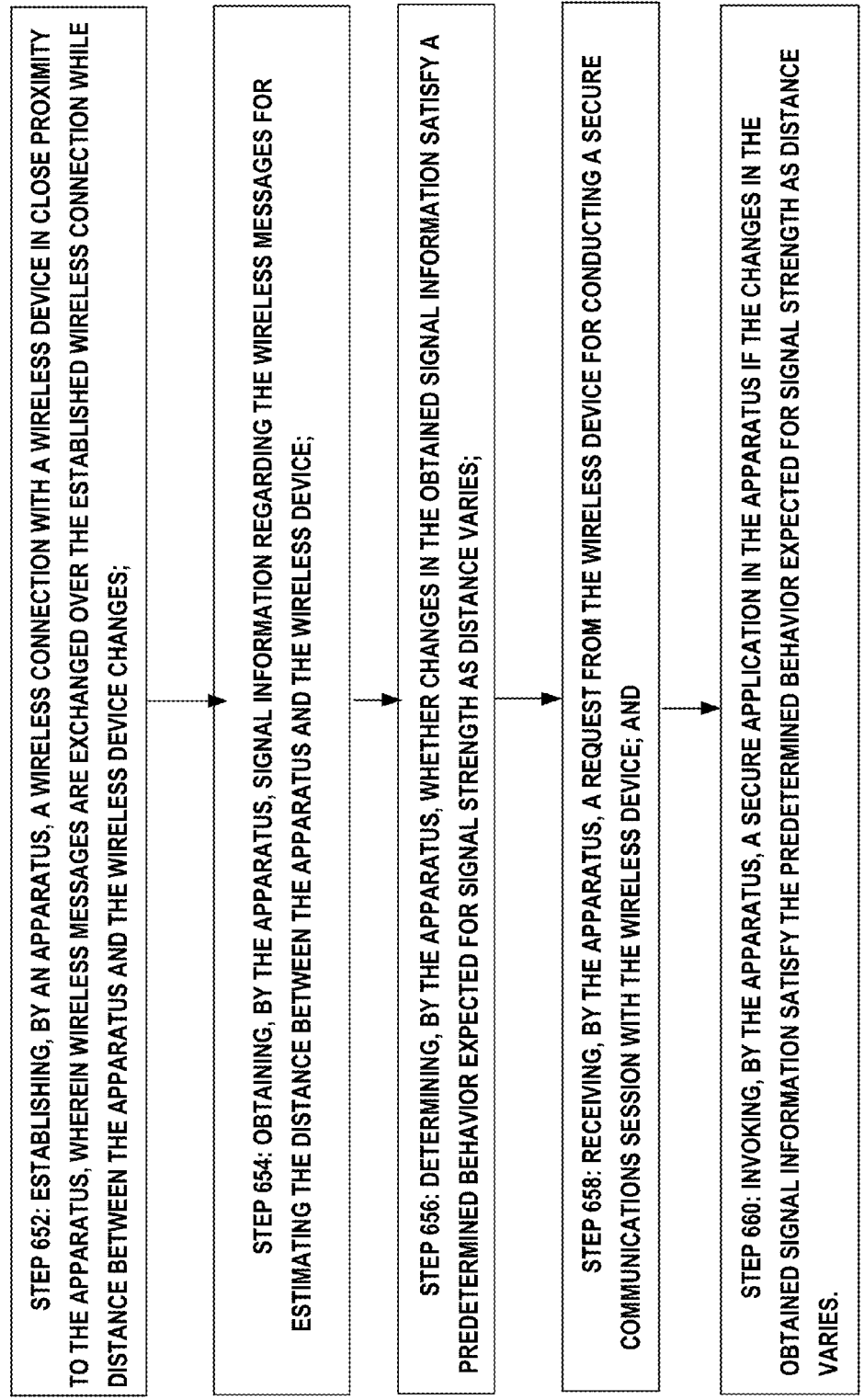
FIG. 6B is an illustration of an example flow diagram of an example process in the wireless service device, in accordance with at least one embodiment of the present invention.

FIG. 6B is an illustration of an example flow diagram 650 of an example process in the service device 102, in accordance with at least one embodiment of the present invention. The steps of the flow diagram represent computer code instructions stored in the RAM and/or ROM memory of the service device 102, which when executed by the central processing units (CPU) 125, carry out the functions of the example embodiments of the invention. The steps may be carried out in another order than shown and individual steps may be combined or separated into component steps. The flow diagram has the following steps:

Step 652: establishing, by an apparatus, a wireless connection with a wireless device in close proximity to the apparatus, wherein wireless messages are exchanged over the established wireless connection while distance between the apparatus and the wireless device changes;

Step 654: obtaining, by the apparatus, signal information regarding the wireless messages for estimating the distance between the apparatus and the wireless device;

Step 656: determining, by the apparatus, whether changes in the obtained signal information satisfy a predetermined behavior expected for signal strength as distance varies;

Step 658: receiving, by the apparatus, a request from the wireless device for conducting a secure communications session with the wireless device; and Step 660: invoking, by the apparatus, a secure application in the apparatus if the changes in the obtained signal information satisfy the predetermined behavior expected for signal strength as distance varies.

FIG. 7 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:

receiving, by an apparatus, one or more wireless discovery messages;

determining, by the apparatus, whether a wireless device is in close proximity and within touching range to the apparatus based on information obtained from the one or more received wireless discovery messages;

exchanging, by the apparatus, messages with the wireless device in response to having determined that the wireless device is in close proximity to the apparatus;

transmitting or receiving, by the apparatus, a request to establish a secure communications session with the wireless device;

measuring, by the apparatus, signal strength of the exchanged messages while distance changes to the wireless device while within close proximity;

determining, by the apparatus, whether changes in the measured signal strength of the exchanged messages satisfy a predetermined behavior expected for signal strength when in close proximity to the wireless device as distance varies; and establishing, by the apparatus, the secure communications session with the wireless device, in response to determining that the changes in the measured signal strength of the exchanged messages satisfy the predetermined behavior expected for signal strength as distance varies.

2. The method of claim 1, wherein the exchanged messages are wireless discovery messages.

3. The method of claim 2, wherein the one or more wireless discovery messages are at least one of a Bluetooth inquiry response message or a Bluetooth Low Energy advertising message.

4. The method of claim 1, further comprising:
establishing, by the apparatus, a wireless connection with the wireless device in response to determining that the wireless device is in close proximity to the apparatus, wherein the messages are exchanged over the established wireless connection while the apparatus changes its distance from the wireless device and obtains signal information from the wireless connection messages usable for estimating the distance between the apparatus and the wireless device.

5. The method of claim 1, further comprising:
invoking, by the apparatus, a secure application in the apparatus if the changes in the measured signal strength of the exchanged messages satisfy the predetermined behavior expected for signal strength as distance varies.

6. The method of claim 1, further comprising:
wherein the information obtained from one or more wireless discovery messages and the signal information obtained from the exchanged messages, includes at least RSSI information corresponding the distance between the apparatus and the wireless device.

7. A method, comprising:
establishing, by an apparatus, a wireless connection with a wireless device in close proximity and within touching range to the apparatus, wherein wireless messages are exchanged over the established wireless connection while distance between the apparatus and the wireless device changes;
transmitting or receiving, by the apparatus, a request to establish a secure communications session with the wireless device;
obtaining, by the apparatus, signal information regarding the wireless messages for estimating the distance between the apparatus and the wireless device;
determining, by the apparatus, whether changes in the obtained signal information satisfy a predetermined behavior expected for signal strength when in close proximity to the wireless device as distance varies; and
establishing, by the apparatus, the secure communications session with the wireless device, in response to determining that the changes in the obtained signal information satisfy the predetermined behavior expected for signal strength as distance varies.

8. The method of claim 7, further comprising:
increasing, by the apparatus, a quantity of the wireless messages exchanged with the wireless device to enhance the determining whether the predetermined behavior expected for signal strength as distance varies is satisfied, wherein the wireless connection messages are at least one of a Bluetooth basic rate/enhanced data rate data connection packet or a Bluetooth Low Energy data connection packet.

9. A apparatus, comprising:
at least one processor;
at least one memory including computer program code;
the at least one memory and the computer program code configured to, with the at least one processor, cause the apparatus at least to:
receive one or more wireless discovery messages;
determine whether a wireless device is in close proximity and within touching range to the apparatus based on information obtained from the one or more received wireless discovery messages;
exchange messages with the wireless device in response to having determined that the wireless device is in close proximity to the apparatus;
transmit or receive a request to establish a secure communications session with the wireless device;
measure signal strength of the exchanged messages while distance changes to the wireless device while within close proximity;
determine whether changes in the measured signal strength of the exchanged messages satisfy a predetermined behavior expected for signal strength when in close proximity to the wireless device as distance varies; and
establish the secure communications session with the wireless device, in response to determining that the changes in the measured signal strength of the exchanged messages satisfy the predetermined behavior expected for signal strength as distance varies.

10. The method of claim 9, wherein the exchanged messages are wireless discovery messages.

11. The apparatus of claim 10, wherein the one or more wireless discovery messages are at least one of a Bluetooth inquiry response message or a Bluetooth Low Energy advertising message.

12. The method of claim 9, further comprising:
the at least one memory and the computer program code configured to, with the at least one processor, cause the apparatus at least to:
establish a wireless connection with the wireless device in response to determining that the wireless device is in close proximity to the apparatus, wherein the messages are exchanged over the established wireless connection while the apparatus changes its distance from the wireless device and obtains signal information from the wireless connection messages usable for estimating the distance between the apparatus and the wireless device.

13. The apparatus of claim 9, further comprising:
the at least one memory and the computer program code configured to, with the at least one processor, cause the apparatus at least to:
invoke a secure application in the apparatus if the changes in the measured signal strength of the exchanged messages satisfy the predetermined behavior expected for signal strength as distance varies.

14. The apparatus of claim 9, wherein the information obtained from one or more wireless discovery messages and the signal information obtained from the exchanged messages, includes at least RSSI information corresponding the distance between the apparatus and the wireless device.

15. A apparatus, comprising:
at least one processor;
at least one memory including computer program code;
the at least one memory and the computer program code configured to, with the at least one processor, cause the apparatus at least to:
establish a wireless connection with a wireless device in close proximity and within touching range to the apparatus, wherein wireless messages are exchanged over the established wireless connection while distance between the apparatus and the wireless device changes;
transmit or receive a request to establish a secure communications session with the wireless device;

obtain signal information regarding the wireless messages for estimating the distance between the apparatus and the wireless device;

determine whether changes in the obtained signal information satisfy a predetermined behavior expected for signal strength when in close proximity to the wireless device as distance varies; and establish the secure communications session with the wireless device, in response to determining that the changes in the obtained signal information satisfy the predetermined behavior expected for signal strength as distance varies.

16. The apparatus of claim 15, further comprising:

the at least one memory and the computer program code configured to, with the at least one processor, cause the apparatus at least to:

increase a quantity of the wireless messages exchanged with the wireless device to enhance the determining whether the predetermined behavior expected for signal strength as distance varies is satisfied, wherein the wireless connection messages are at least one of a Bluetooth basic rate/enhanced data rate data connection packet or a Bluetooth Low Energy data connection packet.

17. A computer program product comprising computer executable program code recorded on a computer readable, non-transitory storage medium, the computer executable program code comprising:

code for receiving, by an apparatus, one or more wireless discovery messages;

code for determining, by the apparatus, whether a wireless device is in close proximity and within touching range to the apparatus based on information obtained from the one or more received wireless discovery messages;

code for exchanging, by the apparatus, messages with the wireless device in response to having determined that the wireless device is in close proximity to the apparatus;

code for transmitting or receiving, by the apparatus, a request to establish a secure communications session with the wireless device;

code for measuring, by the apparatus, signal strength of the exchanged messages while distance changes to the wireless device while within close proximity;

code for determining, by the apparatus, whether changes in the measured signal strength of the exchanged messages satisfy a predetermined behavior expected for signal strength when in close proximity to the wireless device as distance varies; and code for establishing, by the apparatus, the secure communications session with the wireless device, in response to determining that the changes in the measured signal strength of the exchanged messages satisfy the predetermined behavior expected for signal strength as distance varies.

18. The computer program product of claim 17, further comprising:

code for invoking, by the apparatus, a secure application in the apparatus if the changes in the measured signal strength of the exchanged messages satisfy the predetermined behavior expected for signal strength as distance varies.

19. A computer program product comprising computer executable program code recorded on a computer readable, non-transitory storage medium, the computer executable program code comprising:

code for establishing, by an apparatus, a wireless connection with a wireless device in close proximity and within touching range to the apparatus, wherein wireless messages are exchanged over the established wireless connection while distance between the apparatus and the wireless device changes;

code for transmitting or receiving, by the apparatus, a request to establish a secure communications session with the wireless device;

code for obtaining, by the apparatus, signal information regarding the wireless messages for estimating the distance between the apparatus and the wireless device;

code for determining, by the apparatus, whether changes in the obtained signal information satisfy a predetermined behavior expected for signal strength when in close proximity to the wireless device as distance varies; and code for establishing, by the apparatus, the secure communications session with the wireless device, in response to determining that the changes in the obtained signal information satisfy the predetermined behavior expected for signal strength as distance varies.

20. The computer program product of claim 19, further comprising:

code for increasing, by the apparatus, a quantity of the wireless messages exchanged with the wireless device to enhance the determining whether the predetermined behavior expected for signal strength as distance varies is satisfied, wherein the wireless connection messages are at least one of a Bluetooth basic rate/enhanced data rate data connection packet or a Bluetooth Low Energy data connection packet.

* * * * *